US012625890B2

(12) United States Patent
Sanghi et al.

(10) Patent No.: US 12,625,890 B2
(45) Date of Patent: May 12, 2026

(54) INTERACTIVE DATASET PREPARATION

(71) Applicant: INTERNATIONAL BUSINESS MACHINES CORPORATION, Armonk, NY (US)

(72) Inventors: Anupam Sanghi, Gwalior (IN); Rajmohan Chandrahasan, Kanchipuram District (IN); Arvind Agarwal, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/399,013

(22) Filed: Dec. 28, 2023

(65) Prior Publication Data

US 2025/0217389 A1    Jul. 3, 2025

(51) Int. Cl.
*G06F 16/28* (2019.01)
*G06F 16/22* (2019.01)

(52) U.S. Cl.
CPC ........ *G06F 16/287* (2019.01); *G06F 16/2282* (2019.01)

(58) Field of Classification Search
CPC ........................... G06F 16/287; G06F 16/2282
See application file for complete search history.

(56) References Cited

U.S. PATENT DOCUMENTS

| | | | |
|---|---|---|---|
| 11,243,919 B2 | 2/2022 | Bartlett et al. | |
| 2009/0265370 A1* | 10/2009 | Rucker | G06F 16/2423 |
| | | | 707/999.102 |
| 2018/0173781 A1* | 6/2018 | Rosier | G06F 16/27 |
| 2021/0342785 A1* | 11/2021 | Mann | G06F 40/186 |
| 2022/0222271 A1* | 7/2022 | Stolze | G06F 16/27 |
| 2022/0318493 A1 | 10/2022 | Cervelli et al. | |

OTHER PUBLICATIONS

Musleh, Mashaal et al.; CoClean: Collaborative Data Cleaning; Proceedings of the 2020 ACM SIGMOD International Conference on Management of Data; Jun. 14-19, 2020; pp. 2757-2760.
Chugh, Vidhi; How to Improve Data Quality using a Semantic Layer; Atscale (https://www.atscale.com); Oct. 27, 2022; 4 pages.
Gupta, Nitin et al.; Data Quality Toolkit: Automatic assessment of data quality and remediation for machine learning datasets; arXiv:2108. 05935v2 [cs.LG] Sep. 5, 2021; 9 pages.

(Continued)

*Primary Examiner* — Cam Y T Truong
(74) *Attorney, Agent, or Firm* — Lily Neff, Esq.; Heslin Rothenberg Farley & Mesiti P.C.; George S. Blasiak, Esq.

(57) ABSTRACT

Methods, computer program products, and systems are presented. The method computer program products, and systems can include, for instance: discovering semantic operations within a table based dataset, wherein the discovering semantic operations within the table based dataset includes examining of logging data, wherein the logging data specifies atomical physical changes that have been applied to the table based dataset responsively to receipt of change specifying input data from one or more user.

20 Claims, 10 Drawing Sheets

(56) References Cited

OTHER PUBLICATIONS

Visualizing Data in Oracle Analytics Server—Data Profiles and Semantic Recommendations; https://docs.oracle.com/sn/middleware/bi/analytics-server/user-oas/data-profiles-and-semantic-recommendations.html#GUID-44AD6507-9E49-4568-BO0F-BE26BAD25085; retrieved from the Internet Mar. 9, 2023; 6 pages.

Shraga, Roee et al.; Explaining Dataset Changes for Semantic Data Versioning with Explain-Da-V (Technical Report); Proceedings of the VLDB Endowment, vol. 16, Issue 6; Feb. 1, 2023; pp. 1587-1600.

Xi, Yihai et al.; EasyDR: A Human-in-the-loop Error Detection&Repair Platform for Holistic Table Cleaning; Proceedings of the VLDB Endowment, vol. 15, Issue No. 12; Aug. 1, 2022; pp. 3578-3581.

Rezig, El Kindi et al.; Towards an End-to-End Human-Centric Data Cleaning Framework; Proceedings of the Workshop on Human-In-the-Loop Data Analytics; Jul. 5, 2019; 7 pages.

Krishnan Sanjay et al.; Towards Reliable Interactive Data Cleaning: A User Survey and Recommendations; Proceedings of the Workshop on Human-In-the-Loop Data Analytics; Jun. 26, 2016; 5 pages.

* cited by examiner

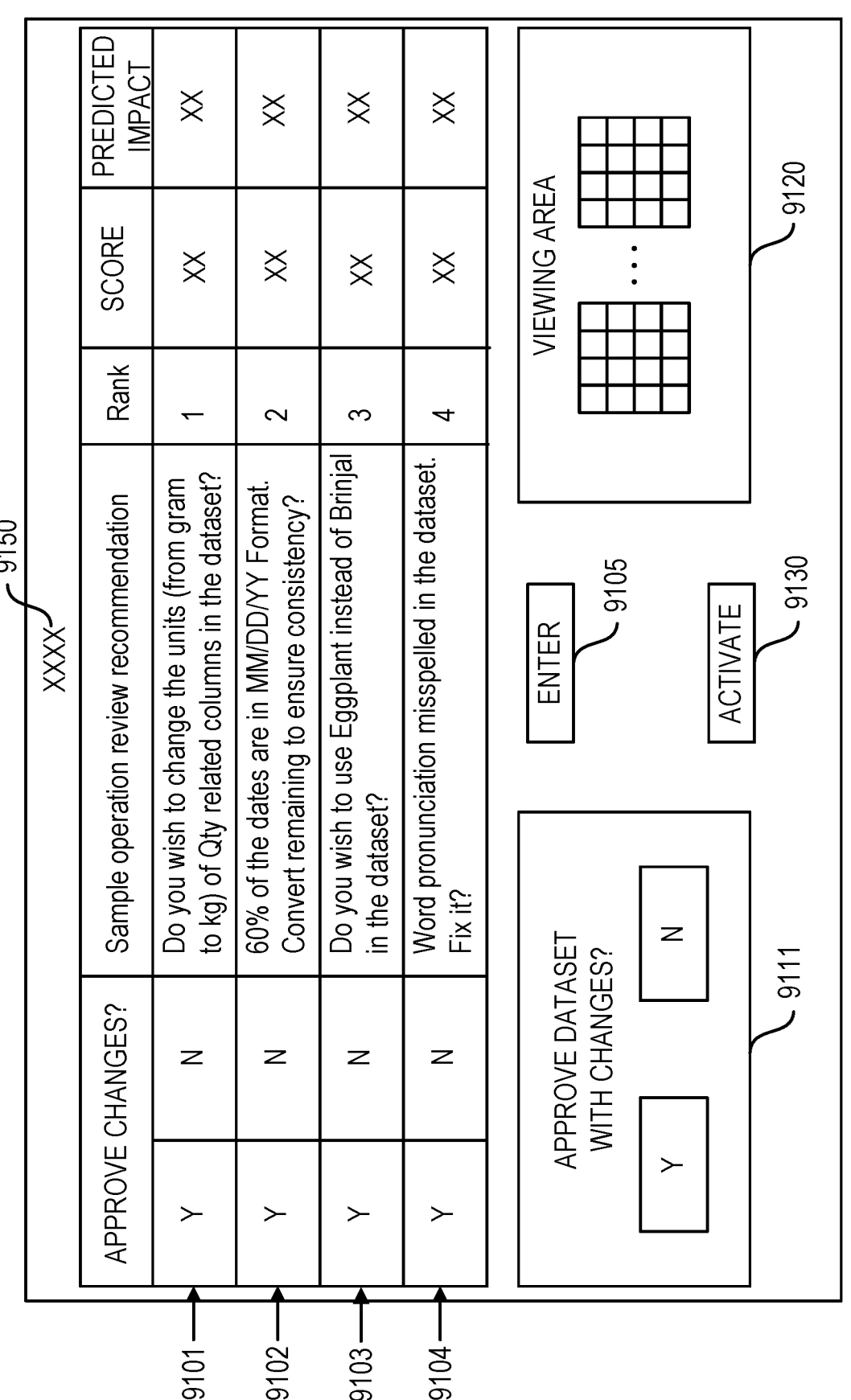

| APPROVE CHANGES? | | Sample operation review recommendation | Rank | SCORE | PREDICTED IMPACT |
|---|---|---|---|---|---|
| Y | N | Do you wish to change the units (from gram to kg) of Qty related columns in the dataset? | 1 | XX | XX |
| Y | N | 60% of the dates are in MM/DD/YY Format. Convert remaining to ensure consistency? | 2 | XX | XX |
| Y | N | Do you wish to use Eggplant instead of Brinjal in the dataset? | 3 | XX | XX |
| Y | N | Word pronunciation misspelled in the dataset. Fix it? | 4 | XX | XX |

9150

9101
9102
9103
9104

VIEWING AREA

9120

ENTER

9105

ACTIVATE

9130

APPROVE DATASET WITH CHANGES?

INTERACTIVE DATASET PREPARATION

Embodiments herein relate to datasets generally, and particularly to interactive dataset preparation.

Data structures have been employed for improving operation of a computer system. A data structure refers to an organization of data in a computer environment for improved computer system operation. Data structure types include containers, lists, stacks, queues, tables and graphs. Data structures have been employed for improved computer system operation e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: discovering semantic operations within a table based dataset, wherein the discovering semantic operations within the table based dataset includes examining of logging data, wherein the logging data specifies atomical physical changes that have been applied to the table based dataset responsively to receipt of change specifying input data from one or more user, wherein the table based dataset includes at least one table having rows and columns that define cells; generating prompting data in dependence on the discovering semantic operations within the table based dataset; and interacting with at least one user in dependence on the discovering semantic operations within the table based dataset, wherein the interacting with the at least one user in dependence on the discovering semantic operations within the table based dataset includes presenting on a user interface the generated prompting data to the at least one user, wherein the prompting data prompts the at least one user to perform at least one action with respect to the table based dataset.

In another aspect, a computer program product can be provided. The computer program product can include a computer readable storage medium readable by one or more processing circuit and storing instructions for execution by one or more processor for performing a method. The method can include, for example: discovering semantic operations within a table based dataset, wherein the discovering semantic operations within the table based dataset includes examining of logging data, wherein the logging data specifies atomical physical changes that have been applied to the table based dataset responsively to receipt of change specifying input data from one or more user, wherein the table based dataset includes at least one table having rows and columns that define cells; generating prompting data in dependence on the discovering semantic operations within the table based dataset; and interacting with at least one user in dependence on the discovering semantic operations within the table based dataset, wherein the interacting with the at least one user in dependence on the discovering semantic operations within the table based dataset includes presenting on a user interface the generated prompting data to the at least one user, wherein the prompting data prompts the at least one user to perform at least one action with respect to the table based dataset.

In a further aspect, a system can be provided. The system can include, for example a memory. In addition, the system can include one or more processor in communication with the memory. Further, the system can include program instructions executable by the one or more processor via the memory to perform a method. The method can include, for example: discovering semantic operations within a table based dataset, wherein the discovering semantic operations within the table based dataset includes examining of logging data, wherein the logging data specifies atomical physical changes that have been applied to the table based dataset responsively to receipt of change specifying input data from one or more user, wherein the table based dataset includes at least one table having rows and columns that define cells; generating prompting data in dependence on the discovering semantic operations within the table based dataset; and interacting with at least one user in dependence on the discovering semantic operations within the table based dataset, wherein the interacting with the at least one user in dependence on the discovering semantic operations within the table based dataset includes presenting on a user interface the generated prompting data to the at least one user, wherein the prompting data prompts the at least one user to perform at least one action with respect to the table based dataset.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 9 depicts a user interface according to one embodiment;

DETAILED DESCRIPTION

Figure 1:
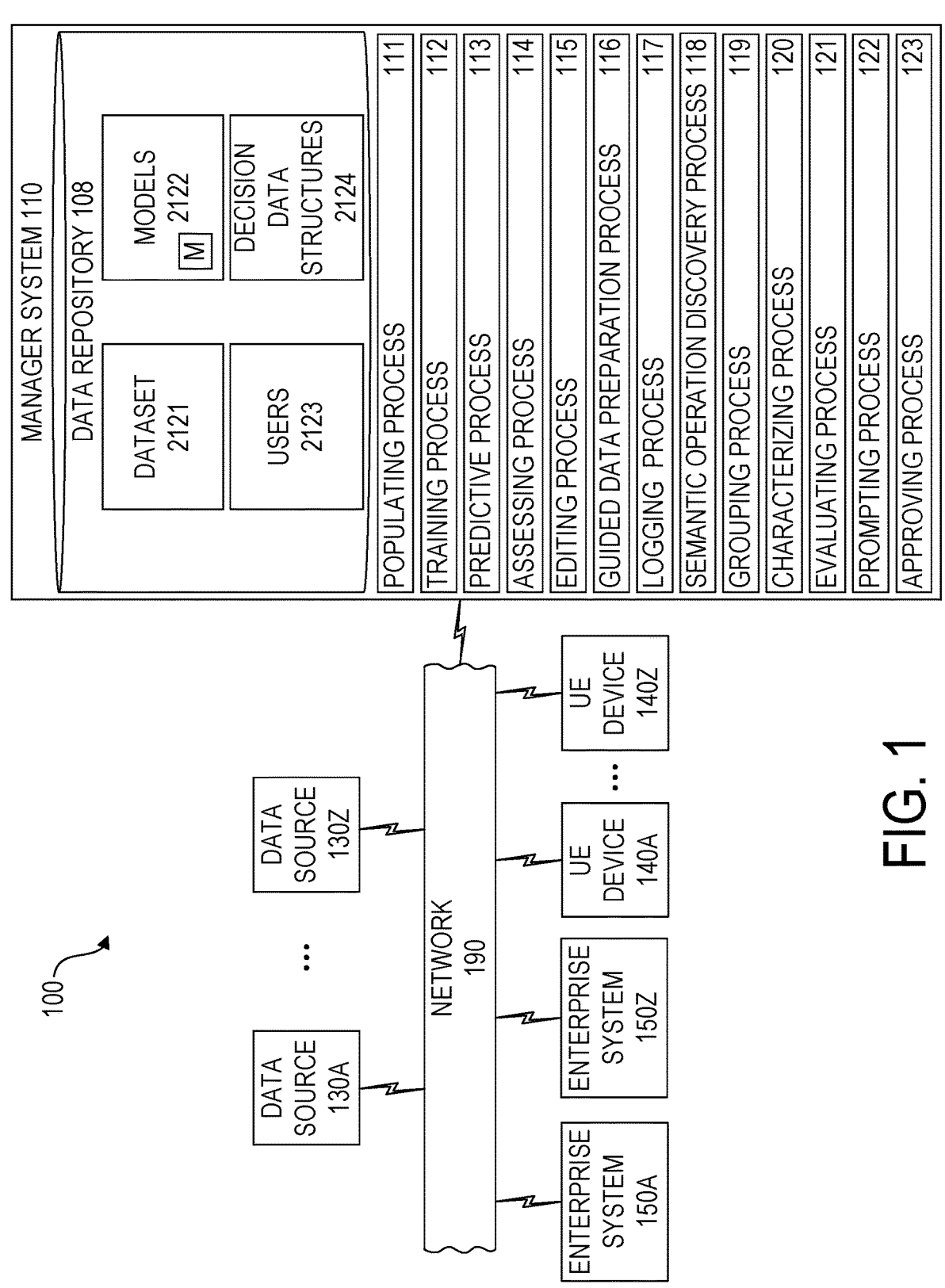
FIG. 1 depicts a system having a manager system, data sources, user equipment devices, and enterprise systems according to one embodiment.

System 100 for use in data preparation is shown in FIG. 1. System 100 can include manager system 110 having an associated data repository 108, data sources 130A-130Z, user equipment (UE) devices 140A-140Z, and enterprise systems 150A-150Z. Manager system 110, data sources 130A-130Z, and UE devices 140A-140Z, and enterprise systems 150A-150Z can be connected with one another via network 190. Network 190 can include a physical network and/or virtual network. A physical network can include, for example, a physical telecommunications network connecting numerous computing nodes or systems such as computer servers and computer clients. A virtual network can, for example, combine numerous physical networks or parts thereof into a logical virtual network. In another example, virtual networks can be defined over a single physical network. In reference to data sources 130A-130Z, UE devices 140A-140Z, and enterprise systems 150A-150Z, "Z" can refer to any positive integer.

Manager system 110, data sources 130A-130Z, UE devices 140A-140Z, and enterprise systems 150A-150Z can be computing node based devices with instances of each including one or more computing node.

In one embodiment, manager system 110 can be external to each instance of data sources 130A-130Z in each instance of UE devices 140A-140Z. In one embodiment, manager system 110 can be collocated with an instance of one or more of data sources 130A-130Z and/or one or more of UE devices 140A-140Z.

UE devices 140A-140Z can be associated to users of system, such as data manager users and data engineer users. UE devices 140A-140Z can be provided, e.g., by laptops, smartphones, tablets, and the like. UE devices 140A-140Z can be configured to present prompting data thereon, for prompting action of a user, such as action in respect to a dataset.

Embodiments herein recognize that data preparation can benefit data quality. Embodiments herein recognize that quality of data can impact downstream analytic and modeling tasks. Embodiments herein recognize that many changes to dataset data can be during data preparation, involving, e.g., misspelling, wrong format, inconsistency, etc. Embodiments herein recognize that changes made to the data can benefit from review before accepting them in a collaborative work environment. Embodiments herein recognize that reviewing these data changes can be challenging and error-prone task due to many reasons, e.g., the sheer scale of the dataset can make attributes of the changes beyond the capacity of human to understand.

Embodiments herein recognize that, in another aspect, the reviewer of changes to a dataset can be different from the person who makes the data changes. For example, in one use case, a data manager (governance officer) provides access to datasets in a data catalog, while a data engineer makes changes to data.

Embodiments herein recognize that each atomical physical data update operation has an underlying semantic reasoning behind it. Embodiments herein provide processing of atomical physical data update logging data to derive semantic reasoning that will make it easier to understand the "why"

along with "what" of the operation. More specifically, embodiments herein can process logging data to provide semantic operation tags that can serve as inputs to further processing for the generation of prompting data for presentment to a user.

Embodiments herein can provide a system and related methods for semantically understanding updates made to a dataset and group them intelligently for collective semantic reviewing and selective approval, registration, and implementation of such changes. Embodiments herein can provide a system and method for automatically generating a collective review summary of updates made in a dataset during data preparation in combination with user interface features for selective approval, registration, and implementation of dataset changes. Embodiments herein can provide a method to analyse cell level data changes and discover the intended semantic operation by collective reasoning. Embodiments herein can provide a method to group semantic operations discovered by data content, data type or location of change. Embodiments herein can provide a method to build aggregate views on grouped semantic operations and thus summarize the review recommendations and a method to rank them by priority, together with selective user interface control for approval, registration, and implementation (or rejection and disapproval) of summarized dataset changes. Embodiments herein provide a method to consider user feedback for incremental improvement of the ranking of semantic review recommendations.

Data repository 108 can store various data. In dataset area 2121, data repository 108 can store a dataset. The dataset stored in datasets area 2122 can be a table based dataset and can include one or more table. A table of dataset area 2121 can be organized into rows and columns. In one example, manager system 110 can be configured to apply data from the described one or more dataset for training a machine learning model and then can query the model once trained for purposes of returning predictions.

Embodiments herein recognize that deficient data can negatively impact a variety of downstream processes. In one example, data of a dataset can be used to train a machine learning model. Embodiments herein recognize that various deficiencies of data can negatively impact an accuracy with which the trained predictive model can provide predictions. In one example, first and second parameter values can be of a common parameter and yet, the data labeling inconsistency of a dataset can configure the dataset so that the first and second parameter value pairs are recorded as being of first and second different parameters. In such an example, trained machine learning model trained with the described dataset can be unable to learn trends presented in the first and second described parameter values. Embodiments herein recognize that users of UE devices 140A-140Z can include users having differentiated data rights to a one or more dataset of dataset area 2121. In one example, first users can have data editing rights and can be absent of data approval rights and second users have both data editing and approval rights. Such second users can be regarded as data manager users.

Data repository 108 in models area 2122 can store trained predictive models that are trained by training processes herein. In one example, manager system 110 can use data of one or more dataset stored in dataset area 2121 for training of predictive models stored in models area 2122.

Data repository 108 in users area 2123 can store data on users of system 100. System 100 can define a collaborative data environment. In a collaborative data environment, a crowdsourced collection of users can be assigned various access rights to one or more dataset of dataset area 2121. Users area 2123 can record data on users of system 100 including in respect to their data rights, e.g., can specify whether the users have editing rights, and/or approval rights with respect to one or more dataset of dataset area 2121. In one embodiment, manager system 110 can assign users of system 100 of a first user classification editing rights with respect to one or more dataset without assigning approval rights to such users. In another example, manager system 110 can assign users of a second user classification editing rights and approval rights with respect to one or more dataset of dataset area 2121.

Data repository 108 in decision data structures area 2124 can store one or more decision data structure for return of action decisions by manager system 110. The one or more decision data structure can include, e.g., a decision table, one or more decision tree, one or more decision list, and the like.

Manager system 110 running populating process 111 can include manager system 110 iteratively populating and updating one or more dataset of dataset area 2121. Manager system 110 running populating process 111 can include manager system 110 iteratively querying data sources of data sources 130A-130Z in order to update one or more dataset of dataset area 2121. Embodiments herein recognize that in a machine learning scenario, a dataset for use in training a predictive model can be iteratively updated to included new and more recently timestamp data, which timestamped data can be received from data source 130A-130Z on manager system 110 running populating process 111 to query such data sources 130A-130Z.

Data sources 130A-130Z can include, e.g., internet of things (IoT) data sources, enterprise system data sources, document archive data sources, social media data sources, and the like.

Manager system 110 running training process 112 can include manager system 110 iteratively training one or more predictive model stored in models area 2122 of data repository 108. Embodiments herein recognize that manager system 110 running training process 112 can include manager system 110 iteratively training one or more predictive model with use of data from one or more dataset of dataset area 2121.

Embodiments herein recognize that where dataset data of dataset area 2121 is deficient, such deficiency in the data can result in erroneous training of a predictive model such that the predictive model is unable to return accurate predictions. To address such challenges recognized herein, embodiments herein can include features for guided cleaning of dataset data for use in training a predictive model. Guided cleaning of a dataset can include the generation of user interface prompting data that prompts the user to approve, register and implement (or disapprove and reject) groups of changes made to cells of a dataset.

Manager system 110 running assessing process 114 can include manager system 110 assessing a trained predictive model in dependence on accuracy of the predictive model, which assessing serves as an assessing of data quality of dataset data used to train the predictive model. Manager system 110 running assessing process 114 can include training a predictive model with training data from a table based dataset subject to semantic operation discovery and related processing herein, and querying the trained predictive model with use of test data that comprises query data and holdout data. A trained predictive model can be queried with use of query data of the test data and compared to holdout data and return data returned from querying the predictive model can be compared to holdout data for determination of an accuracy of the predictive model. Manager system 110 running assessing process 114 can score a trained predictive model and generated scoring data can be used as control in controlling guided data cleaning by manager system 110.

Manager system 110 running predicting process 113 can include manager system 110 querying a predictive model M stored in models area 2122 for return of a prediction. The prediction can be used, e.g., for an enterprise process, e.g., an information technology (IT) process such as migration of a virtual machine, or an industrial machine process involving operation of a mechanical machine.

Manager system 110 running editing process 115 can include performing one or more atomical change to a dataset responsively to receiving change specifying input data from one or more user. The change specifying input data can be received through a particularly configured user interface.

Manager system 110 running guided data preparation process 116 can include manager system 110 examining dataset data and responsively presenting to at least one user interactive prompting data in dependence on the examining. The examining of dataset data can include various processes such as logging process 117, semantic operation discovery process 118, grouping process 119, characterizing process 120, evaluating process 121, prompting process 122, and approving process 123. The interactive prompting data can be presented on a specifically configured user interface. In one use case, the one or more user can be in common with the at least one user. In one use case, the one or more user can be different than the at least one user.

System 100, in one embodiment, can define a collaborative data preparation environment in which a user of a first user classification has first data rights to a dataset and in which a user of a second user classification has second data rights to a dataset. According to one example, the user of the first classification can have editing rights in the dataset without approval rights and the user of the second classification can have editing rights as well as approval rights in the dataset.

Manager system 110 running logging process 117 can include manager system 110 analyzing changes applied to a dataset responsively to receipt of change specifying input data for output of logging data. The logging data can specify atomical physical changes that have been applied to a dataset responsively to receipt of change specifying input data received from one or more user. Manager system 110 running logging process 117 can include manager system 110 generating atomical physical change logging data. The atomical physical change logging data can include, for respective changes of a set of changes, a cell identifier that specifies a cell in which a change to dataset data was made and a data value of the cell resulting from the change. The cell identifier can include, e.g., the table identifier, a row identifier, and a column identifier for the changed data.

Manager system 110 running semantic operation discovery process 118 can include manager system 110 processing extracted logging data. Manager system 110 running semantic operation discovery process 118 can include manager system 110 processing instances of logging data and for the various incidents of logging data generating semantic operation tags. The semantic operation tags can, in one example, specify a reason for a change. Manager system 110 running semantic operation discovery process 118 can include manager system 110 performing first stage processing, second stage processing, and third stage processing. First stage processing can include manager system 110 using cell information of logging data entry. Manager system 110 using second stage processing can include manager system 110 using column information of a logging data entry and manager system 110 applying third stage processing can include manager system 110 using table information of a logging data entry.

Manager system 110 running grouping process 119 can include manager system 110 grouping outputs of semantic operation discovery into various groups. Manager system 110 running grouping process 119 can include manager system 110 identifying groups of cells of a dataset having matching one more semantic tag. Manager system 110 running grouping process 119, in one embodiment, can include manager system 110 identifying groups of cells of a dataset that were subject to atomical physical change and which have having matching sets of semantic operation tags as a result of semantic operation discovery processing herein. The identifying can include matching of semantic operation tags between cells that have been subject to atomical physical change.

Manager system 110 running characterizing process 120 can include manager system 110 characterizing the groups identified by manager system 110 performing grouping process 119. Manager system 110 performing group characterization process 120 can include manager system 110 generating statistics associated to the various identified semantic operation groups, according to one example.

Figure 2:
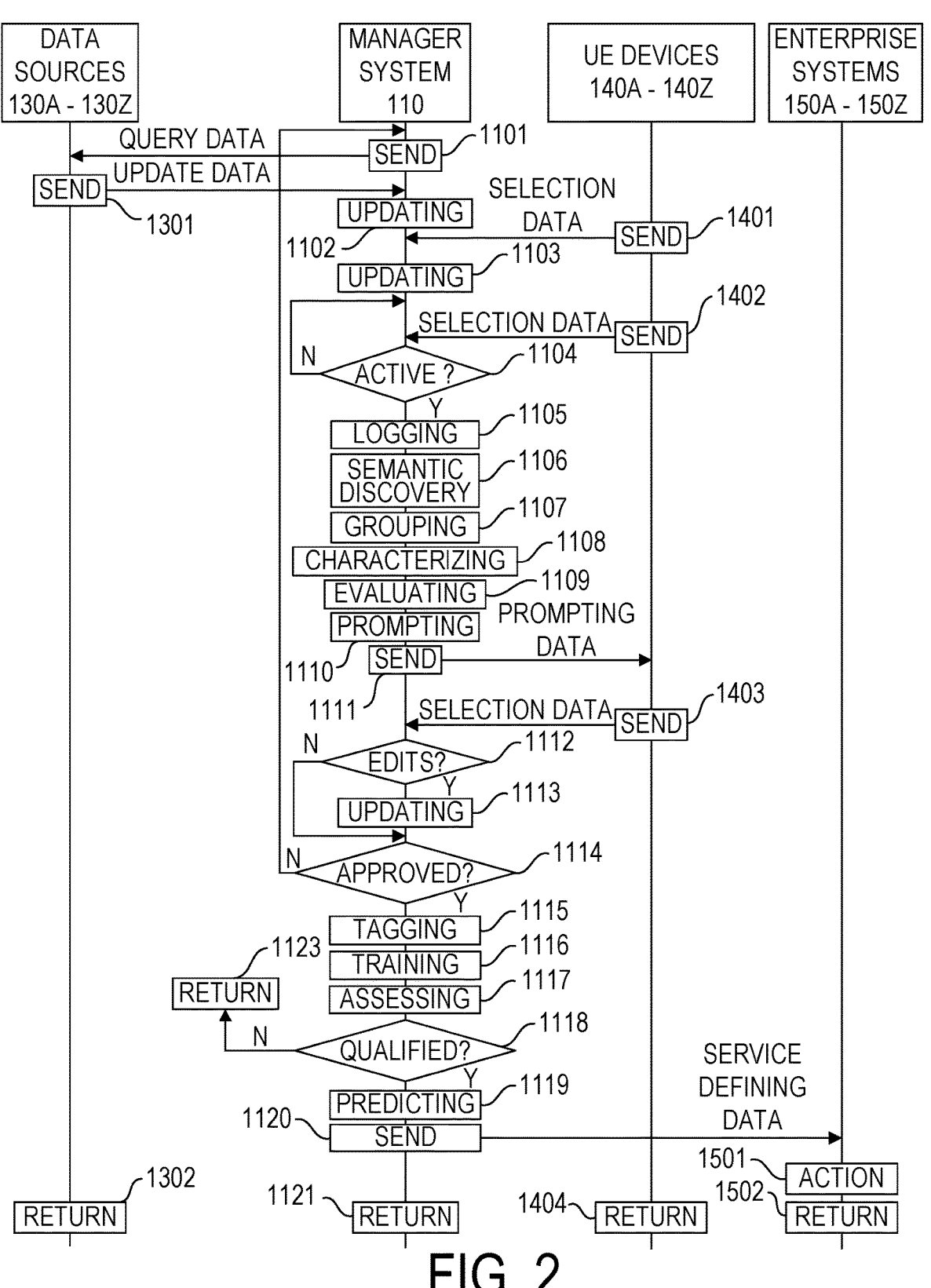
FIG. 2 is a flowchart illustrating a method for performance by a manager system according to one embodiment.

A method for performance by manager system 110 interoperating with data sources 130A-130Z, UE devices 140A-140Z and enterprise systems 150A-150Z is set forth in reference to the flowchart of FIG. 2.

At block 1101, manager system 110 can send query data to data sources 130A-130Z and, in response, data sources 130A-130Z can responsively send dataset data for receipt by manager system 110 and responsively to the received data, manager system 110 can perform updating of dataset data at block 1102. At block 1101, manager system 110 can be sending query data for query of data sources 130A-130Z for return of update data from various data sources 130A-130Z. In response to receipt of the query data, data sources 130A-130Z can be sending update data for receipt by manager system 110, and in response to the received update data, manager system 110 can perform updating of one or more dataset of dataset area 2121 to include the update data. In one example of updating performed at block 1102, manager system 110 can add rows to one or more table of a dataset of dataset area 2121.

On completion of updating block 1102, manager system 110 can receive selection data sent at block 1401 from UE devices 140A-140Z of one or more user, and in response to received selection data, manager system 110 can perform updating of the dataset at block 1103. The selection data sent by the one or more user at block 1401 can include editing data, wherein editing is performed on one or more dataset. Editing operations can include, e.g., addressing misspellings, changing values, changing units, and the like, as are referenced in examples of atomical physical dataset changes as set forth herein. On completion of the updating performed at block 1103, manager system 110 can proceed to block 1104.

At block 1104, manager system 110 can examine selection data received from at least one user sent at block 1402 and based on the selection data sent at block 1402 can ascertain whether a guided data preparation process has been activated by the at least one user.

At block 1104, manager system 110, can ascertain whether a guided data preparation process has been activated and can iteratively perform the ascertaining at block

1104 until a time that the guided data preparation process has been activated. In response to the activating of the guided data preparation process, manager system 110 can proceed to logging block 1105. The at least one user sending selection data at block 1402 can be in common with the one or more user sending selection data at block 1401. In another example, the at least one user sending selection data at block 1402 can be different than the one or more user sending selection data at block 1401.

On determination at block 1104 that at least one user has activated the data preparation process, manager system 110 can proceed to logging block 1105 in which manager system 110 can produce an atomical physical update operations log specifying atomical physical changes to the dataset and on completion of logging block 1105, manager system 110 can proceed to semantic operation discovery block 1106. Manager system 110 performing logging block 1105 and semantic operation discovery block 1106 is described, in one example, with reference to FIG. 3 and FIG. 4.

Figure 3:
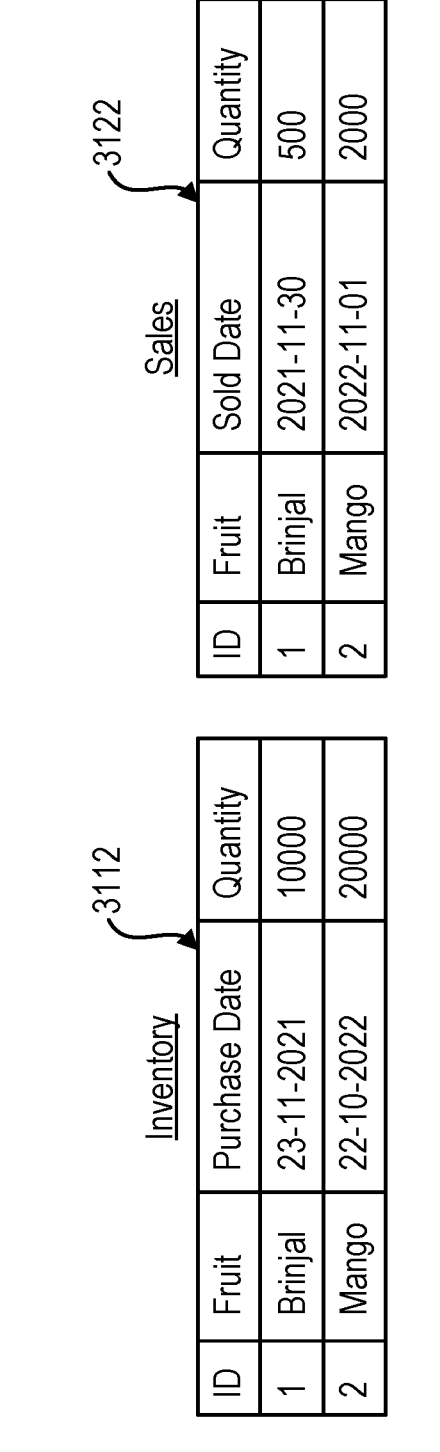
FIG. 3 is a dataset according to one embodiment.

FIG. 3 depicts an illustrative dataset 3102 on which manager system 110 can operate. In the simplified illustrative dataset of FIG. 3, a dataset can include first and second tables 3112 and 3122. The first table 3112 can be an inventory table and the second table 3122 can be a sales table, according to one example.

Figure 4:
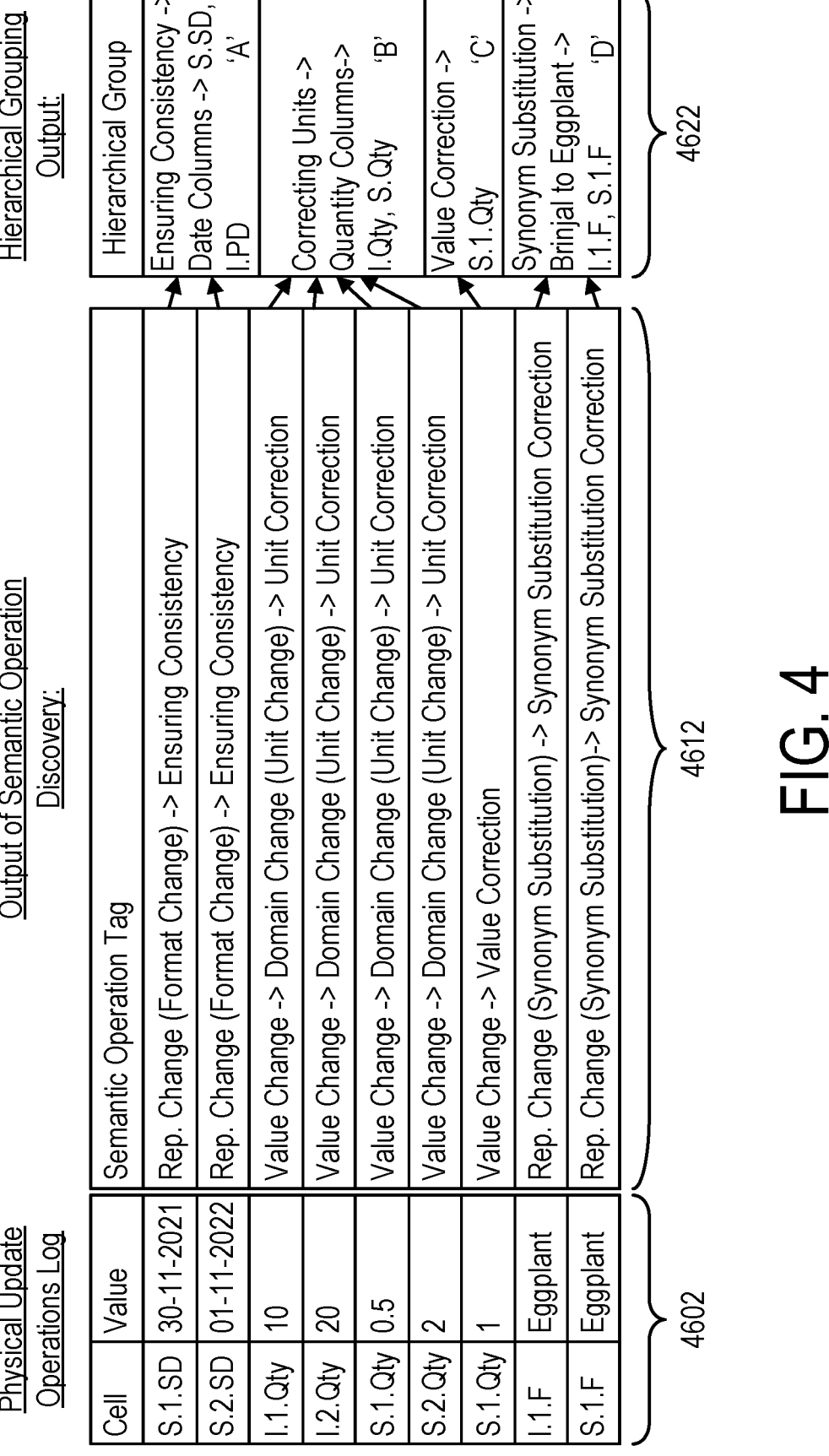
FIG. 4 depicts data logging, semantic discovery processing, and group identification processing according to one embodiment.

Referring to logging data 4602 as depicted in FIG. 4, manager system 110 can produce logging data 4602 as a result of performing logging at block 1105. In the embodiment depicted in FIG. 4, logging data 4602 can include a record of updates to dataset 3102 by the one or more user sending selection data at block 1401. The logging data can specify, for each cell data change over a time considered, a cell identifier identifying a cell of the table in which the change occurred as well as a new data value associated to the change. Within logging data 4602, a specific cell can be identified by table, row and column. Thus, in the example of FIG. 4, the first listed change can list the cell 'S.1.SD' indicating the cell identifier specified by table 'S', row '1' and column 'SD' (sold date).

With further reference to FIG. 4, manager system 110 at semantic operation discovery block 1106 can output semantic operation discovery tags that have resulted from performing semantic operation discovery. The semantic operation tags 4612 can include, in certain cases a first tag resulting from first stage processing, a second tag resulting from second stage processing, and a third tag resulting from third stage processing. The first semantic operation tag can specify that the change performed was a 'representation change', or alternatively a 'value change'. The second semantic operation tag can specify the type of change, e.g., 'format change', 'unit change', 'synonym substitution', and the third semantic operation tag can specify a reason for the change, e.g., 'ensuring consistency', 'unit correction', 'synonym substitution correction'.

Figures 5, 6:
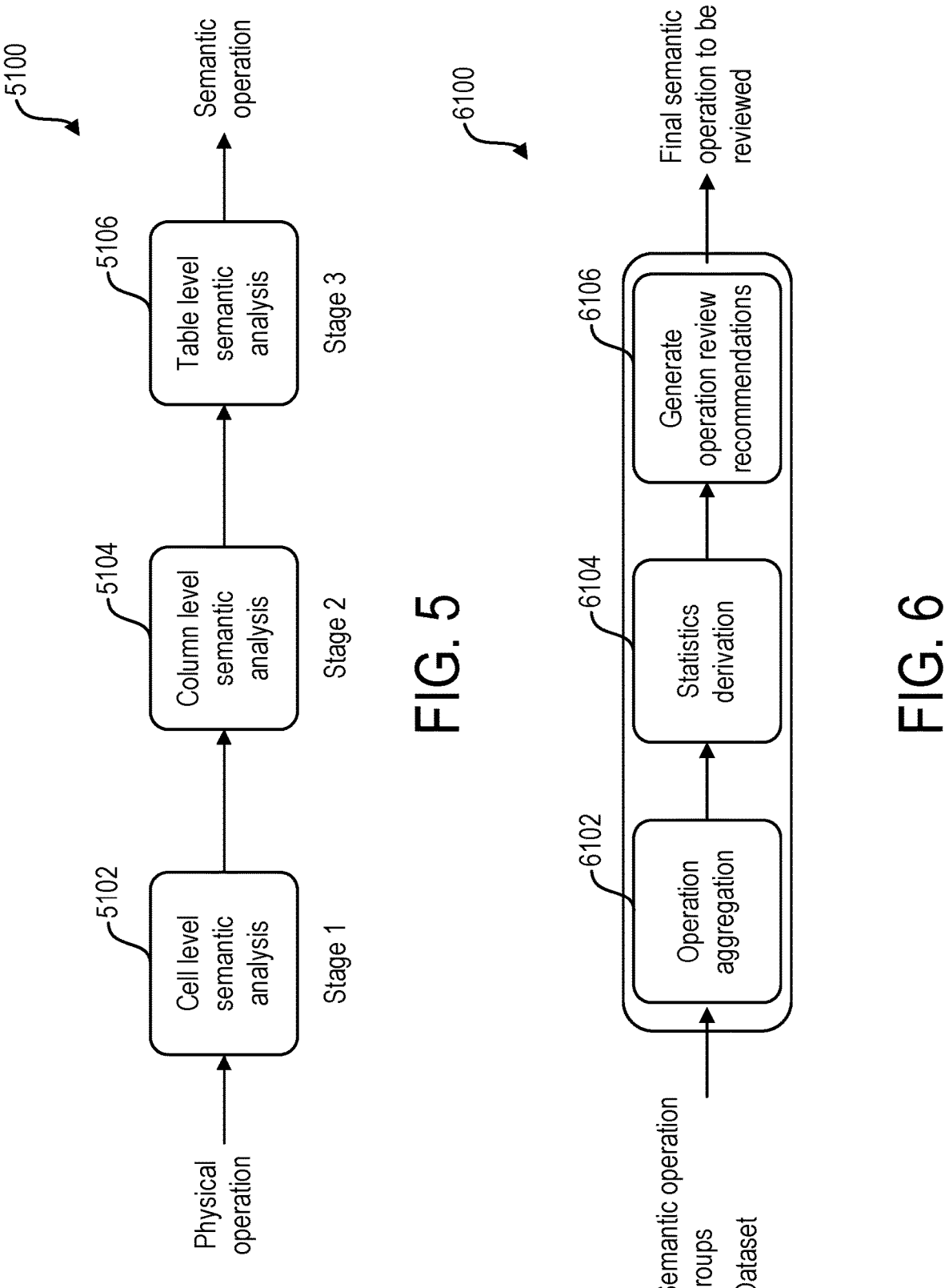
FIG. 5 depicts semantic operation discovery processing according to one embodiment.
FIG. 6 depicts semantic operation group identification processing according to one embodiment.

Manager system 110 in performing semantic operation discovery at block 1106 can perform semantic operation discovery in first, second, and third stages. The first stage can be, as depicted in FIG. 5, a cell level semantic analysis. The second stage can include, as depicted in FIG. 5, a column level semantic analysis, and the third stage can include, as depicted in FIG. 5, a table level semantic analysis. Manager system 110, with respect to each atomic physical operation specified in logging data 4602 (FIG. 4), can apply semantic operation discovery for output of semantic operation tags 4612.

For each atomic physical change to a dataset, manager system 110 can associate to the atomic physical change, semantic operation tagging data. Semantic operation tagging data can include, e.g., a first semantic operation tag recording an output of the cell level semantic analysis depicted in FIG. 5. a second semantic operation tag recording an output of the column level semantic analysis depicted in FIG. 5, and the third semantic operation tag recording an output of the table level semantic analysis depicted in FIG. 5. FIG. 5 depicts a summary of a semantic operation discovery 5100. At block 5102, manager system 110 can perform cell level semantic operation discovery analysis. At block 5104, manager system 110 can perform column level semantic operation discovery analysis, and at block 5106, manager system 110 can perform table level semantic operation discovery analysis.

While semantic operation tags 4612 of FIG. 4 depict semantic operation tagging resulting from cell level analysis with the classification of "representation change", and "value change," embodiments herein recognize that other classifications of cell edits can be performed, e.g., a "misspelling" classification as set forth herein in Table A.

Manager system 110 performing semantic operation discovery, according to the stages depicted in FIG. 5, is further described in reference to Table A below.

TABLE A

Semantic Operation Discovery

| Stage 1 (using cell level information) | Stage 2 (using column level information) | Stage 3 (using table information) |
|---|---|---|
| Misspelling Representation Change | | Correction/Ensuring Consistency in Representation |
| Value Change Value Correction (non-numeric) | Domain (units or normalization) change Value Correction (numeric) | Correction/Ensuring Consistency in Domain |

Table A summarizes semantic operation discovery outputs that can be performed in a respective cell level semantic operation discovery stage, a column level semantic operation discovery stage, and a table level semantic operation discovery stage as depicted in FIG. 5.

Referring to Table A, manager system 110 performing first cell level stage semantic operation discovery processing can classify cell level changes made to a dataset in terms as belonging, e.g., to a 'misspelling' classification, a 'representation change' classification, or a 'value change' classification. Referring to the first stage semantic operation discovery processing depicted in Table A, manager system 110 can flag certain cell changes as being changes in respect to misspelled words. For performing classification resulting in the classifying of the cell as being a 'misspelling' change, manager system 110 can reference prior data of a cell to a dictionary and can discern that the change involved in misspelling where a prior version of the word is not in the dictionary and the current version of the word is in the dictionary.

Manager system 110 for performing first stage semantic operation discovery processing for discovering a 'representation change' can identify changes that are not misspellings but fall into the category of being 'pattern, language, or appearance' changes, 'use of synonym changes', or 'alternative spelling' changes. Pattern changes can include, e.g., Date/Address/Ph. No. format. Language changes can include, e.g., 1/01/One. Appearance changes can include, e.g., Capitalization, Spacing. Synonym substitution can include, e.g., brinjal/eggplant/aubergine. Alternate spellings can include, e.g., organisation/organization.

Manager system 110 with reference to Table A can classify all cell changes that are not classified as being 'misspelling' changes or 'representation' changes as being 'value' changes. Once manager system 110 classifies a change as being a 'value' change, manager system 110 can further classify the value change as being a 'numeric value' change or a 'nonnumeric value' change. Referring to Table A, manager system 110 can classify value changes that are numeric as being value corrections.

Manager system 110 on completion of cell level semantic operation discovery processing (stage 1) can proceed to column level semantic operation discovery processing (stage 2). Manager system 110 can perform column level semantic operation discovery processing (stage 2) in a manner that depends on a result of the cell level semantic operation discovery processing. With reference to FIG. 5, manager system 110, on completion of first stage cell level semantic operation discovery processing for semantic operation discovery, can proceed to the second stage column level semantic operation discovery processing. Manager system 110 can perform the described second stage column level semantic operation discovery processing in dependence on the cell change classifications performed according to the first stage cell level semantic operation discovery processing. Manager system 110 performing column level second stage semantic operation discovery processing can apply rules as summarized in Table B.

TABLE B

Numerical value changes are classified as 'unit' change, 'normalization' change or 'value correction' changes. If the transformed value is into a known unit, the operation can be tagged as a 'unit' change. If the transformation is not a unit change but a simple multiplicative factor, the operation can be tagged as a 'normalization' change. All other value changes can be categorized as 'value correction' changes.

In performing second stage column level semantic operation discovery processing, manager system 110 can further classify cell changes classified as being value changes as belonging to one of the following sub classifications: unit change, unit normalization or value correction. Manager system 110 performing column level second stage processing can classify a changed value as being a unit change when the transformed value has been transformed into a known unit.

On the determination that a transformed cell is not a unit change but a simple multiplication factor, manager system 110 can classify the change according to column level processing as a 'unit normalization' change. Manager system 110 applying second stage column level processing can classify all other changes as being 'value correction' changes, i.e., all changes that are not determined to be all value corrections that are determined not to be classified as being 'unit' changes or 'normalization' changes can be classified as being 'value correction' changes according to second stage semantic operation discovery processing. Changes of "units" or "normalization" herein can be regarded to be "domain" changes herein.

On completion of column level semantic operation discovery processing, manager system 110 can proceed to the third stage table level semantic operation discovery processing for providing a semantic operation discovery tag that specifies a reason for a change. For performance of table level semantic operation discovery processing, manager system 110 can apply the following rules as summarized in Table C.

performing evaluations of identified semantic operation groups, and the presentment of differentiated prompting data associated to such groups. In one example, the tagging of semantic operation as a 'correction' rather than 'ensuring consistency' can cause a first semantic operation group to be ranked higher than a second semantic operation group, and its associated prompting data to be presented at higher priority than prompting data for the second semantic operation group.

Referring to the semantic operation discovery processing according to the embodiment of Table A, it can be seen that, for non-numeric changes, second column level processing can be skipped. Stage 3 can be performed for numeric and non-numeric changes. Therefore, after identifying a representation change, the correction versus consistency resolution can occur in Stage 3. In one aspect, stage 2 can be avoided for misspelling or representation change. As can be seen in Tale A, misspelling and non-numeric value corrections can be processed at stage 1 while stage 2 and stage 3 processing can be avoided. Numeric value corrections can be processed at stage 2 while stage 3 processing can be avoided. For non-numeric values, value correction can be identified in stage 1. For numeric values, stage 1 can identify that there is a value change, and processing can continue in stage 2. The change can be classified as a value correction or a domain change in stage 2 after checking the column level information. When the change is classified as a domain change, processing can continue at stage 3, where the classification of correction or 'ensuring consistency' is made. Numeric value corrections can be processed at stage

TABLE C

| All Representation/Domain changes are further classified as a case of 'correction' or 'ensuring consistency' where 'domain' refers to units or normalization. If the transformation matches other occurrences of the value/column of the same type, manager system 110 can consider it a case of 'ensuring consistency' in Representation/Domain. All other transformations are considered a case of 'correction' in Representation/Domain. A unit change can be a case of correction or ensuring consistency between similar measurement columns -> Identified in Stage 3. Again, this can be a case of correction or ensuring consistency between columns -> identified in Stage 3. |
| --- |

For performance of table level semantic operation discovery processing in a third stage, manager system 110 can classify all representation or domain (units or normalization) changes as being corrections or ensuring consistency. Manager system 110 can perform the rule such that if a transformation matches other occurrences of the value transformation in columns of the same type, manager system 110 can tag the changes as being 'ensuring consistency in representation or domain' (where change in 'domain' refers to change in 'units' or 'normalization'). Manager system 110 can consider all other transformations as being correction in representation/domain. The differentiation in semantic operation tags can impact ensuing processing, including in 2 while processing at stage 3 can be avoided. Misspelling and non-numeric value corrections can be processed at stage 1 while processing at stage 2 as well as stage 3 can be avoided. In the case of a misspelling, processing can be avoided at both stage 2 and stage 3. In the case a representation change is discovered at stage 1, processing at stage 2 can be avoided, and processing can move to stage 3 for classification of the change as a 'correction' or 'ensuring consistency'.

A summary of identified semantic operations that can be identified in accordance with semantic operation discovery block 1106 is set forth in reference to Table D.

TABLE D

| Semantic operation number | Semantic Operations | Data Types | Target |
| --- | --- | --- | --- |
| (1) | Misspelling | String | Cell(s)/Column(s)/Table |
| (2) | Representation Correction | | Cell(s)/Column(s)/Column-Type (e.g., all date columns)/Table |
| | Pattern: e.g., Date/Address/Ph. No. format | All | |
| | Language: e.g., 1/01/One, Linguistic Change | All | |
| | Appearance: e.g., Capitalization, Spacing | String | |

TABLE D-continued

| Semantic operation number | Semantic Operations | Data Types | Target |
|---|---|---|---|
| | Synonym Substitution: e.g., brinjal/eggplant/aubergine | String | |
| | Alternate Spelling: e.g., organization/organization | String | |
| (3) | Domain (unit or normalization) correction | | Cell(s)/Column(s)/ Column-Type |
| | Measurement Units: e.g., Dollar/Rupee Normalization | Numeric | |
| (4) | Value Correction | All | Cell(s)/Column |
| (5) | Consistency in Representation | Same as (2) | Same as (2) |
| (6) | Consistency in Domain (unit or normalization) | Same as (3) | Same as (3) |

Manager system 110, on completion of semantic operation discovery block 1106, can proceed to block 1107. At block 1107, manager system 110 can perform grouping of semantic operations on cells in dependence on a result of the semantic operation discovery. Manager system 110 performing grouping at block 1107 can include manager system 110 providing grouping outputs 4622 as set forth in FIG. 4.

Providing grouping outputs 4622, as set forth in FIG. 4, can include manager system 110 performing grouping in dependence on semantic operation tags provided at semantic operation discovery block 1106. As seen by FIG. 4, manager system 110 at grouping block 1107 can group first changed cells together where the changed cells were subject to the semantic operation discovery tag 'ensuring consistency' (group 'A' of FIG. 4), can group second changed cells together that were subject to the classification 'unit correction' together (group 'B' of FIG. 4), can group third changed cells subject to the semantic operation discovery tag 'value correction together' (group 'C' of FIG. 4), and can group fourth changed cells together that were subject to the semantic operation discovery tag 'synonym substitution' (group 'F' of FIG. 4).

Manager system 110 identifying semantic operation groups, in one embodiment, can include manager system 110 matching multiple tags that are associated to different cells. In one embodiment, the identifying of a group encompassing multiple cells can be based on the complete semantic operation pipeline, i.e., matching of all of the semantic tags (possibly of different levels) between the multiple cells. These tags together help in identifying the nature of grouping (content, column type, dataset location). The providing of multiple semantic operation tags for respective cells, provided with use of different processing stages, can result in the identification of cells that have strong associations to one another, and which are related to one another in ways that are beyond the capacity of a user to identify.

Accordingly, there is set forth herein discovering semantic operations within a table based dataset, wherein the discovering semantic operations within the table based dataset includes examining of logging data, wherein the logging data specifies atomical physical changes that have been applied to the table based dataset responsively to receipt of change specifying input data from one or more user, wherein the table based dataset includes at least one table having rows and columns that define cells; generating prompting data in dependence on the discovering semantic operations within the table based dataset; and interacting with at least one user in dependence on the discovering semantic operations within the table based dataset, wherein the interacting with the at least one user in dependence on the discovering semantic operations within the table based dataset includes presenting on a user interface the generated prompting data to the at least one user, wherein the prompting data prompts the at least one user to perform at least one action with respect to the table based dataset, wherein the discovering includes determining, for a first atomical physical change to a first cell of the table based dataset, first semantic operation tags, determining, for a second atomical physical change to a second cell of the table based dataset, second semantic operation tags, determining, for a third atomical physical change to a third cell of the table based dataset, third semantic operation tags, determining, for a fourth atomical physical change to a fourth cell of the table based dataset, fourth semantic operation tags, and wherein the method further includes matching the first semantic operation tags to the second semantic operation tags, performing matching of the third semantic operation tags to the fourth semantic operation tags, identifying a first group of semantic operations based on the matching, and identifying a second group of semantic operations based on the performing matching.

Manager system 110 performing grouping at block 1107 is further described in reference to Table E. For performing grouping, manager system 110 can perform grouping so that corresponding impacted cells are grouped together. Within each group, manager system 110 can subgroup changed cells together based on operation kind in a manner described with reference to Table E.

TABLE E

| Hierarchical Group type | Semantic operations included |
|---|---|
| Content and dataset location | Misspelling Content based representation Correction/consistency e.g.-Synonym Substitution Alternate Spelling |
| Column type and dataset location | Format based representation correction/consistency e.g.-Pattern Domain (unit or normalization) correction/consistency |
| Dataset location | Value correction |

In reference to Table E, an input can include semantic operation tags for each cell and an output can include hierarchical groupings of semantic operations. Referring to Table E, hierarchical groupings can include, e.g., 'content and location' and 'column type and location' and 'location'. Referring to Table E, hierarchical grouping can include content based groupings, column type based groupings, and location based groupings.

Referring to group 'A' of FIG. 4, Group 'A' is a grouping of cells having the semantic operation tag 'ensuring consistency' involving a format change. Manager system 110 referencing the decision data structure of Table E can output the group type 'column type and dataset location' having the values 'date columns', S.SD, I.PD as set forth in FIG. 4. Manager system 110 can identify the semantic operation group 'A' indicated in FIG. 4 by matching the semantic operation tags 4612 of rows 1-2 of FIG. 4.

Referring to group 'B' of FIG. 4, group 'B' is a grouping of cells having the semantic operation tag 'correcting units' involving a unit change. Manager system 110 referencing the decision data structure of Table E can output the group type 'column type and dataset location' having the values 'quantity columns', I.Qty, S.Qty as set forth in FIG. 4. Manager system 110 can identify the semantic operation group 'B' indicated in FIG. 4 by matching the semantic operation tags 4612 of rows 3-6 of FIG. 4.

Referring to group 'C' of FIG. 4, group 'C' is a grouping of cells having the semantic operation tag 'value correction'. Manager system 110 referencing the decision data structure of Table E can output the group type 'Dataset location' having the values S.1.Qty as set forth in FIG. 4. Manager system 110 can identify the semantic operation group 'C' indicated in FIG. 4 by matching the semantic operation tags 4612 of row 7 of FIG. 4.

Referring to group 'D' of FIG. 4, group 'D' is a grouping of cells having the semantic operation tag 'synonym substitution' involving a format change. Manager system 110 referencing the decision data structure of Table E can output the group type 'content and dataset location' having the values 'Brinjal to Eggplant', 1.1F, S.1.F as set forth in FIG. 4. Manager system 110 can identify the semantic operation group 'D' indicated in FIG. 4 by matching the semantic operation tags 4612 of rows 8-9 of FIG. 4.

In regard to content based groupings referenced in Table E, the same semantic operations can be performed in a value that can be presented at multiple locations within a dataset. In one example, different occurrences of the word "brinjal" in a dataset can be replaced with "eggplant". So in this case, the grouping of the semantic operation can be performed on a content basis, where content is "brinjal->eggplant". In regard to column and type based groupings referenced in Table E, the type of a value can be considered at higher priority than the value itself. For example, format of a date can be processed rather than the exact date. So, in this case, correcting the date format within a column or ensuring consistency of date formats across columns defines a semantic operation at a higher level. Such a scenario defines grouping based on column types.

On completion of performing grouping at block 1107, manager system 110 can proceed to block 1108. At block 1108, manager system 110 can perform characterizing of each semantic operation group that was identified by the grouping at block 1107. For performing group characterization, manager system 110 at block 1108 can characterize identified semantic operation groups using operation aggregation, and statistics derivation. The input for performance of semantic group characterization can include semantic operation groups as identified by manager system 110 performing grouping at block 1107, and the output can include generating one or more dataset action recommendation.

Referring to FIG. 6, manager system 110 performing semantic operation group characterization 6100 at block 1108 can include manager system 110 at block 6102 (FIG. 6) performing operation aggregation, manager system 110 at block 6104 performing statistics derivation and manager system 110 at block 6106 performing generating one or more dataset action recommendation.

Manager system 110 for performing operation aggregation at block 6102 (FIG. 6) can include manager system 110 deriving an aggregate view of the semantic operations present in a group and can perform semantic operation group tagging, according to the rules set forth in Table F.

TABLE F

Group characterization-operation aggregation

Manager system 110 can derive an aggregate view of the semantic operations present in an identified group. Where an identified group specifies a word change, manager system 110 can determine whether the word change has been performed for each instance of the word in the dataset. If all occurrences of a word are changed, then manager system 110 can tag an identified semantic operation group as an operation on the dataset. Where an identified semantic operation group specifies a column value transformation, manager system 110 can determine whether all values within the column have been transformed. If all values in a column are transformed, then manager system 110 can tag the semantic operation group as a column level operation. Where an identified group specifies a column type transformation, manager system 110 can determine whether all values within the column-type have been transformed. If all values in a column-type are transformed, then manager system 110 can tag an operation of the identified semantic operation group as a column-type operation.

Manager system 110 for performing statistics derivation at block 6104 (FIG. 6) on an identified semantic operation group can apply the rules as summarized in Table G for additional semantic group tagging.

rows and columns that define cells; generating prompting data in dependence on the discovering semantic operations within the table based dataset; and interacting with at least one user in dependence on the discovering semantic opera-

TABLE G

| Group characterization-statistics derivation |
| --- |
| Statistics Derivation. For each semantic operation group identified at block 1107, manager system 110 can derive statistical information that can aid in producing an aggregated view of the semantic operations. For each content-based operation (e.g., misspelling), manager system 110 can determine, e.g., the number of affected cells, the total number of occurrences in the dataset, and the percentage of cells within the dataset affected. For each column operation, manager system 110 can determine the total number of affected cells in the column, the total number of cells in the dataset, and the percentage of cells in the dataset affected. For each column-type operation, manager system 110 can determine the total number of affected columns, the total number of columns in the dataset, and the percentage of columns in the dataset affected. |

Manager system 110 at characterizing block 1108 with use of the characterizing data of Table F and G can generate one or more action recommendation. For generating an action recommendation defined by text based data, manager system 110 at characterizing block 1108 can make use of a pretrained large language model (LLM). In one example, models M of models area 2122 can include a large language model (LLM) subject to fine tuning training for defining a specific task model. Such model M provided by a specific task model can be subject to training with iterations of supervised learning training data that include (a) semantic operation group values and tags (from the processing of Table F and/or G) (defining input), in combination with (b) text based strings specifying dataset action for the user (defining outcome labels). Trained as described, the described model M provided by a specific task model can learn a relationship between semantic operation group values and tags, and corresponding text specifying action in respect to a dataset. Once trained, the model M provided by a specific task model, on receipt of query data provided by semantic operation group values and tags output at block 1107 and 1108 (specifying characteristics of the semantic operation group), can output a natural language text string that specifies a dataset action to be taken by a user.

Accordingly, there is set forth herein discovering semantic operations within a table based dataset, wherein the discovering semantic operations within the table based dataset includes examining of logging data, wherein the logging data specifies atomical physical changes that have been applied to the table based dataset responsively to receipt of change specifying input data from one or more user, wherein the table based dataset includes at least one table having tions within the table based dataset, wherein the interacting with the at least one user in dependence on the discovering semantic operations within the table based dataset includes presenting on a user interface the generated prompting data to the at least one user, wherein the prompting data prompts the at least one user to perform at least one action with respect to the table based dataset, wherein the method includes identifying a semantic operation group based on first and second cells of the table based dataset having common semantic operation tags resulting from the discovering, and wherein the prompting data presented on the user interface includes a first action-specifying text string mapping to the semantic operation group, and wherein generation of the first action-specifying text string mapping to the semantic operation group has included querying a trained predictive model that has been trained to return strings of dataset action specifying text in response to being queried with query data specifying characteristics of the semantic operation group.

Examples set forth in Table H show example outputs that can be output from the described model M provided by a specific task model which can be defined by fine tuning training of pretrained LLM.

TABLE H

| Example 1 |
| --- |

Query data input to model M: [value and tag data for a semantic operation group referencing a
misspelling]
Example text string output:
Word pronunciation misspelled in the dataset for <>. Fix it with <>?

| Example 2 |
| --- |

Query data input to model M: [value and tag data for a semantic operation group referencing a
synonym substitution correction]
Example text string output:
Do you wish to use Eggplant instead of Brinjal in the dataset?

| Example 3 |
| --- |

Query data input to model M: [value and tag data for a semantic operation group referencing ensuring
pattern consistency in a column type]
Example text string output:
60% of the dates are in MM/DD/YY Format. Convert remaining to ensure consistency?

| Example 4 |
| --- |

Query data input to model M: [value and tag data for a semantic operation group referencing a unit
change in a column type]
Example text string output:
Do you wish to change the units (from gram to kg) of Qty related columns in the dataset?

It will be seen that the different natural language processing text strings of Table H that specify different actions to be taken by a user map to respective ones of different semantic operation groups that have been identified by manager system 110 at block 1107. The generated text strings of Table H define prompting data that can be presented to a user.

Upon completing of characterizing at block 1108, manager system 110 can proceed to performing evaluating at block 1109. At evaluating block 1109, manager system 110 can evaluate the characterized identified semantic operation groups based on their importance and criticality. The evaluating can include ranking of the various identified semantic operation groups.

For performing evaluating at block 1109, manager system 110 can apply a scoring formula as set forth in Eq. 1.

$$S=F1\,W1+F2\,W2+F3\,W3 \qquad \text{(Eq. 1)}$$

Where S is the total score for an identified semantic operation group, F1 is an operation type classifier for the semantic operation group, F2 is a prevalence factor, F3 is a dataset data quality impact factor, and W1-W3 are weights associated to the respective factors F1-F3.

Regarding Factor F1, semantic operation types can include, e.g., ensuring consistency unit correction, value correction, synonym substitution, and the like. Manager system 110 can assign scoring values according to factor F1 with use of a decision data structure as set forth in Table I, wherein different scores are assigned to different semantic operations.

TABLE I

| Row | Semantic operation | Factor F1 scoring value |
| --- | --- | --- |
| 1 | Semantic operation A | 0.6 |
| 2 | Semantic operation B | 0.8 |
| . . . | . . . | . . . |

Where a semantic operation group includes more than one determined semantic operation specified by a semantic operation tag, manager system 110 can aggregate the scoring values associated to the various operations.

Regarding the prevalence factor F2, the prevalence factor can be taken from the statistics derivation output of characterizing block 1108, i.e., the rules summarized in Table G. In other words, the prevalence factor can be dependent on a percentage of cells or columns subject to the change as described in connection with the statistical derivation set forth in connection with Table G. Manager system 110 applying the prevalence factor F2 can scale scoring values under factor F2 in dependence on the percentage of cells or columns affected by a change.

Figure 7:
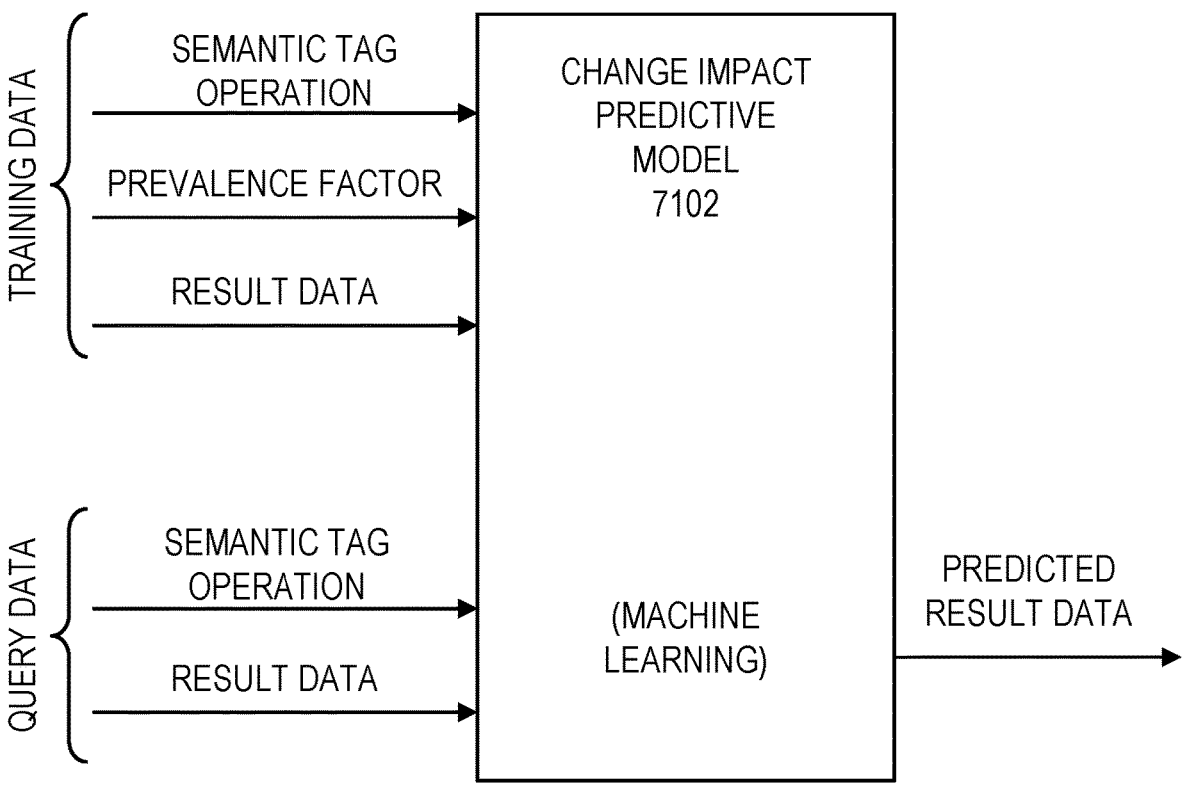
FIG. 7 depicts semantic operation group evaluating processing according to one embodiment.

In one embodiment, a model M of models area 2122 can be provided by an impact predictive model as set forth in FIG. 7. For assigning a scoring value under factor F3 (dataset data quality impact factor), manager system 110 can query impact predictive model 7102 as set forth in FIG. 7. Impact predictive model 7102 can be trained with iterations of training data and once trained, impact predictive model 7102 can be queried to return a prediction as to the impact on dataset data quality of making the change specified the current semantic operation group being evaluated on the quality of the dataset. Impact predictive model 7102 can be trained with iterations of training data, wherein each iteration of training data can include (a) one or more semantic operation tag of the semantic operation group, b) a prevalence factor, i.e., the prevalence of a change within a dataset result data, which is data indicating the impact of the result of making a change on an historical dataset associated to the current dataset. The historical dataset can be a prior iteration of the current dataset, or an historical dataset having a threshold level of similarity with the current dataset. Result data can specify a change in accuracy of a production predictive model (indicating quality of the dataset) trained with training data provided by the current dataset and can be determined by assessing performance of a production predictive model trained with training data provided by the current dataset using holdout data in a manner set forth herein. In one example, accuracy of a production predictive model can be assessed using holdout data prior to, and subsequent to, a training cycle, in order to assess an impact of approving, registering and implementing a change to a dataset. Impact predictive model 7102, once trained, can return predictions in response to applied query data.

Query data for querying impact predictive model 7102 can include one or more semantic operation tag, i.e., the one or more semantic operation tag of the semantic operation group being currently scored using Eq. 1, and the prevalence factor associated to the current semantic operation group being scored, i.e., the prevalence factor applied under Factor F2. In response to the described query data, impact predictive model 7102 can return a prediction as to predicted result of applying the change, e.g., in terms of quality of the current dataset, as can be measured and assessed by assessing performance of a production predictive model trained with training data provided by the current dataset.

Processing at evaluating block 1109 can include a feedback component to dynamically learn and adapt to data manager expert preferences. When a user, e.g., a data manager user reviews the semantic data change operations, the data user has a choice to approve or reject certain changes defined by semantic operation groups. Choices made can be recorded and used as feedback for performance of ranking of various changes. Ranking features for ranking of a categorized and characterized semantic operation, manager system 110 can consider semantic operation type volume of affected data, volume of total data in a category, operation weightage, and feedback from past reviews.

Regarding the weights W1-W3 of Eq. 1, manager system 110 can derive values for the weights W1-W3 according to various methods. Manager system 110 for deriving the values of weights W1-W3 can utilize historical selection data of users such as manager users in selecting identified semantic operation groups for implementation and registration and/or result data associated to historical selection data and/or result data associated to the current dataset.

Manager system 110, for applying the weight W1 associated to factor F1, according to one example, can query data of users area 2123 to ascertain historical selections of semantic operation groups of the current user for historical datasets associated to the current dataset. Manager system 110 can scale weighting, according to frequency of selection for approving, implementation, and registration of like typed semantic operation groups in historical datasets associated to the current dataset. An historical dataset associated to the current dataset can be, e.g., a prior iteration of the current dataset or can include a dataset having a threshold level of similarity to the current dataset. Manager system 110 can apply clustering analysis for identification of datasets having a threshold level of similarity to the current dataset. In performing such clustering analysis, manager system 110 can analyze a variety of different dimensions associated to different datasets, e.g., number of columns, number of rows, percentage of commonly labeled columns, and the like.

Figure 8:
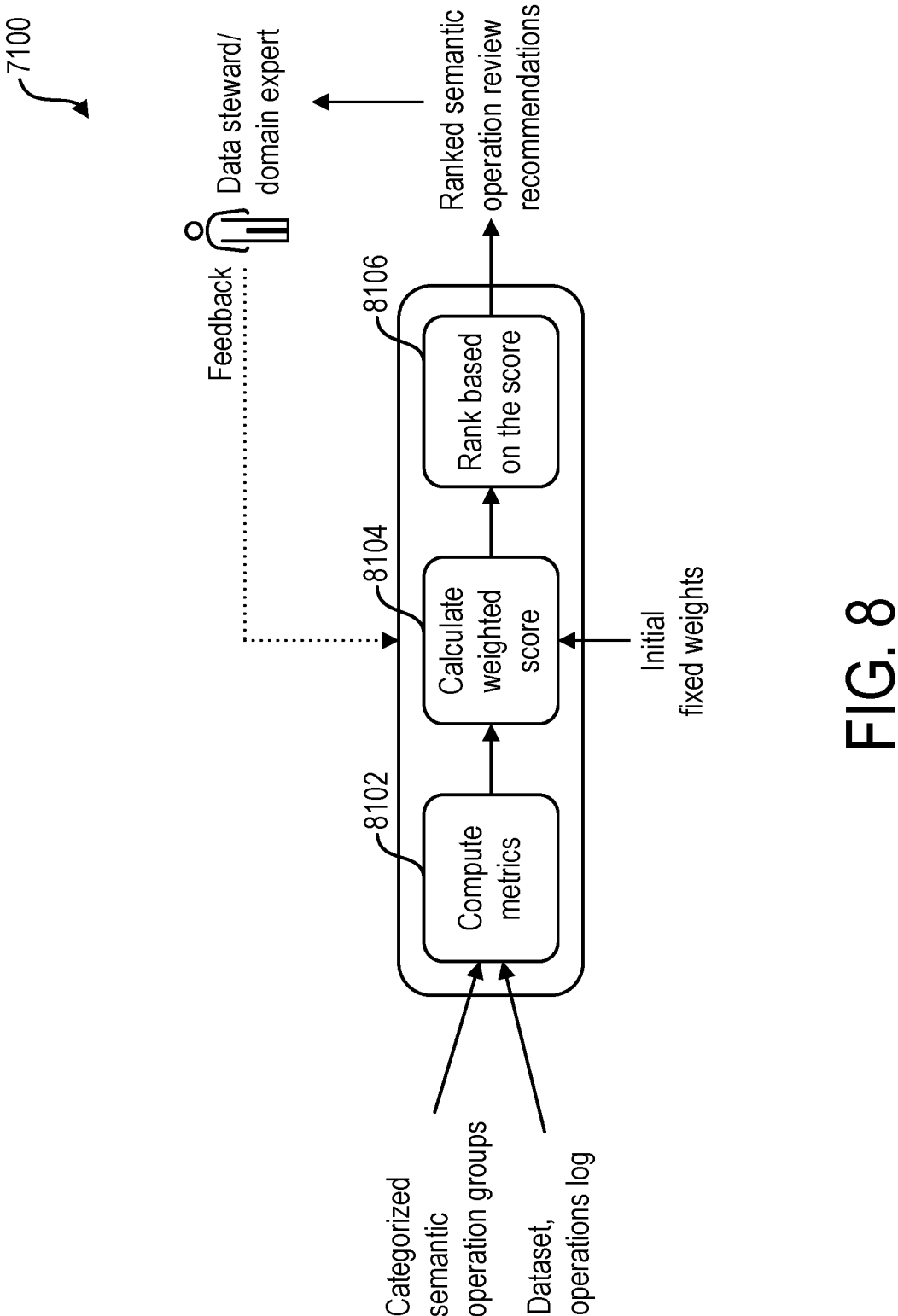
FIG. 8 depicts a predictive model according to one embodiment.

At evaluating block 1109, according to one embodiment, manager system 110 can rank all semantic operation groups identified at block 1107 and characterized at block 1108. FIG. 8 depicts a generalized method for evaluating identified semantic operation groups, of which the described Eq. 1 is an example. In reference to FIG. 8, manager system 110 at block 8102 can compute metrics, e.g., as set forth in connection with Table G. At block 8104, manager system 110 can apply variable weights to scores. At block 8106, manager system 110 can output a ranking of identified semantic operation groups in dependence on the weights and the metrics. As set forth in connection with FIG. 8, ranking of identified semantic operation groups can be in dependence on feedback on a user, such as a data manager user. The feedback can be provided, e.g., based on historical selections of a data manager user.

On completion of evaluating block 1109, manager system 110 can proceed to prompting block 1110. At prompting block 1110, manager system 110 can complete generating of prompting data, which prompting data can be sent to a user at send block 1111 for presentment of the prompting data to the user, such as a data manager user. The generated prompting data can include the generated text strings specifying dataset actions associated to and mapping to identified semantic operation groups as set forth in reference to Table H. In one example, generating of prompting data can be regarded to include generating of the action specifying text string according to the processing set forth in reference to Table H. Prompting data generation at block 1110 can include formatting an ordering of display of generated text strings according to a determined ranking, setting additional display features defining prompting data, e.g., highlights, selection buttons, semantic operation group scoring values, predicted impact qualitative values, and the like.

On completion of prompting block 1110 in which manager system 110 completes generation of prompting data, manager system 110 can proceed to send block 1111. At send block 1111, manager system 110 can send the generated prompting data so that the generated prompting data is presented on a user interface of a user. With completion of send block 1111, manager system 110 can proceed to block 1112.

FIG. 9 depicts an example of prompting data presented on a displayed user interface presented to a user on a UE device of UE devices 140A-140Z associated to a user. Manager system 110 can present prompting data that specifies semantic operation changes according to different semantic operation groups identified at block 1107 as characterized at block 1108 in a ranked order according to the evaluating at block 1109, e.g., with higher ranked prompted for operations presented, e.g., displayed at a higher elevation on a display than lower ranked prompted for operations, and/or with a differentiated highlight (e.g., boldfont, underline, italic, differentiated color, etc.). Manager system 110 with the presented prompting data as shown in FIG. 9 can include text based data specifying the scores associated to the various identified semantic operation groups determined according to Eq. 1 as well as the predicted performance of the various predicted impact of the various operations as determined in a manner described with reference to F3 in Eq. 1. Embodiments herein recognize that the differentiation in semantic operation tags from semantic operation discovery at block 1106 can impact ensuing processing, including in performing evaluations of identified semantic operation groups at block 1109, and the presentment of differentiated prompting data 9101-9104 associated to such groups, e.g., the scoring according to Eq. 1 can impact the ordering of the differentiated prompting data 9101-9104. In one example, the tagging of semantic operation as a 'correction' rather than 'ensuring consistency' from semantic operation discovery at block 1106 can cause a first semantic operation group to be ranked higher than a second semantic operation group, and its associated prompting data to be presented at higher priority (e.g., at higher elevation, differentiated highlight, etc.) than prompting data for the second semantic operation group.

The presented prompting data of FIG. 9 prompts a user to take action in respect to a dataset. The prompting data can include selection areas 9101-9105 that permits a user to selectively approve or disapprove for implementation, registration, and entry of dataset changes that are associated to respectively different identified semantic operation groups. Selection area 9101 is a selection area for selectively approving or disapproving dataset changes of a first identified semantic operation group. As shown, selection area 9101 includes an action specifying text string mapping to the second identified semantic operation group generated by the process described in connection with Table H. Selection area 9102 is a selection area for selectively approving or disapproving dataset changes of a second identified semantic operation group. As shown, selection area 9102 includes an action specifying text string mapping to the second identified semantic operation group generated by the process described in connection with Table H. Selection area 9103 is a selection area for selectively approving or disapproving dataset changes of a third identified semantic operation group. As shown, selection area 9103 includes an action specifying text string mapping to the third identified semantic operation group generated by the process described in connection with Table H. Selection area 9104 is a selection area for selectively approving or disapproving dataset changes of a fourth identified semantic operation group. As shown, selection area 9104 includes an action specifying text string mapping to the fourth identified semantic operation group generated by the process described in connection with Table H. Selection area 9111 can permit approval or disapproval of all changes associated to a set of identified semantic operation groups. The user, such as a data manager user, with use of a user interface according to FIG. 9 can define selection data and can send the selection data at send block 1403. Prompting data of the prompting user interface depicted in FIG. 9 can also include viewing area 9120 permitting the user to view and edit underlying dataset tables defining the current dataset. In another aspect, prompting data of the prompting user interface depicted in FIG. 9 can also include activate area 9130 permitting the user to activate the guided data preparation process set forth herein, including logging at block 1105, semantic operation discovery at block 1106 and ensuing processing of blocks 1107-1110 as set forth herein.

In one embodiment, variable data area 9130 of the user interface of FIG. 9 can include a selection feature that permits the user to adjust the weights W1-W3 of Eq. 1. In one use case, the user can drive weights W1 and W2 so that the various rankings of semantic operation groups presented in prioritized format in FIG. 9 is determined entirely based on factor F3 (predicted impact on dataset data quality factor). Thus, the user using the user interface of FIG. 9 can be presented real time feedback including the prompting data text based data specifying predicted data quality impact of any change grouped into an identified semantic operation group. In such a scenario, the user can be iteratively using viewing area 9120 to enter new atomical physical changes to a dataset, activating semantic operation discovery and ensuing processing using activate area 9130 to view text based prompting data specifying predicted data quality impact of such new changes, and approving or disapproving such changes in dependence on the provided prompting data feedback. In other words, the user can be interactively using the user interface to approve or not approve changes in dependence on prompting data that presents predicted data quality impact of such changes.

Accordingly, there is set forth herein discovering semantic operations within a table based dataset, wherein the discovering semantic operations within the table based dataset includes examining of logging data, wherein the logging data specifies atomical physical changes that have been applied to the table based dataset responsively to receipt of change specifying input data from one or more user, wherein the table based dataset includes at least one table having rows and columns that define cells; generating prompting data in dependence on the discovering semantic operations within the table based dataset; and interacting with at least one user in dependence on the discovering semantic operations within the table based dataset, wherein the interacting with the at least one user in dependence on the discovering semantic operations within the table based dataset includes presenting on a user interface the generated prompting data to the at least one user, wherein the prompting data prompts the at least one user to perform at least one action with respect to the table based dataset, wherein the method includes iteratively performing the discovering semantic operations within the table based dataset, the generating prompting data in dependence on the discovering semantic operations within the table based dataset, and the presenting on a user interface the generated prompting data to the at least one user, wherein the prompting data presented on the user interface includes text based data specifying a predicted impact on data quality of the table based dataset associated to a group of semantic operations identified responsively to the discovering.

On receipt of the user defined selection data sent at block 1403, manager system 110 can proceed to decision block 1112. At decision block 1112, manager system 110 can determine whether the user with the selection data sent at block 2402 has made any additional edits to the dataset (e.g., new edits made with use of viewing area 9120 or by disapproval of one or more dataset change associated to one or more semantic operation group) and if so, can perform updating of the dataset at block 1113 and then can proceed to decision block 1114 to determine if the user with the selection data sent at block 1403 has approved the current dataset. Manager system 110 on determining at block 1112 that no edits have been made can bypass updating block 1113 and can proceed to decision block 1114 to determine whether manager user with the selection data sent at block 1403 has approved the current dataset with or without disapproval of dataset changes of one or more semantic operation group.

On approval of the current dataset being recognized at decision block 1114, manager system 110 can proceed to tagging block 1115. At tagging block 1115, manager system 110 can tag the current dataset as updated at block 1113 as being an approved, registered, and implemented dataset. On approval of the dataset and tagging of the dataset at block 1115, manager system 110 can update datasets area 2121 of data repository 108 to specify the updated approved, registered, and implemented status of the dataset and can proceed to training block 1116.

At training block 1116, manager system 110 can train a model M of models area 2122 provided by a production predictive model with use of training data provided by the updated current dataset as updated at block 1113. Embodiments herein recognize that deficient data of poor quality can negatively impact a variety of downstream processes. In one example, data of a dataset can be used to train a machine learning model. Embodiments herein recognize that various deficiencies of data can negatively impact an accuracy with which the trained predictive model can provide predictions. In one example, first and second parameter values can be of a common parameter and yet, the data labeling inconsistency of a dataset can configure the dataset so that the first and second parameter value pairs are recorded as being of first and second different parameters. In such an example, trained machine learning model trained with the described dataset can be unable to learn trends presented in the first and second described parameter values. Models in models area 2122 can include, e.g., production models for use in providing services to end users system 100 and support models such as predictive model 7102 described in FIG. 7 for use in providing support of processes 111-123 (FIG. 1) herein including guiding data preparation process 116.

Training at training block 1116 by manager system 110 can include training a model M of models area 2122 with use of dataset from the approved dataset determined to be approved at decision block 1114 as updated at updating block 1113. On completion of training at block 1116, manager system 110 can proceed to assessing block 1117. In one example, the training of model M at block 1116 can include retraining model M used use of dataset data changed by approved changes selected with the selection data sent at block 1403.

At assessing block 1117, manager system 110 can query model M provided by a production predictive model with use of test data that comprises query data and holdout data. Manager system 110 can query model M with query data of the test data, and can compare output data output from model M in response to query data to holdout data of the test data for determination of an accuracy of model M. Manager system 110 performing assessing at block 1117 can ascertain and quantify an accuracy of the model M based on how well an output prediction of the model M in response to the applied query data of the test data corresponds to a ground truth defined by the described holdout data of the holdout data.

On completion of the assessing at block 1117, manager system 110 can proceed to decision block 1118. At decision block 1118, manager system 110 can ascertain whether model M subject to training at block 1116 is qualified for deployment as production model into a production service. Manager system 110 at block 1118 can determine that model M provided by a production model is qualified for deployment into a production service based on a quantified accuracy of the model M as assessed at block 1117 satisfying a threshold indicating that the updated dataset is of threshold satisfying quality. On the determination at decision block 1118 that the model M and the associated updated dataset used for training is not qualified, manager system 110 can proceed to return block 1123. At return block 1123, manager system 110 can return to a preceding block such as a stage preceding block 1103 and/or block 1112 to facilitate receipt of next selection data from a user sent at block 1401, 1402, and/or 1403, can responsively perform updating the dataset based on the selection data and then can proceed to perform a next iteration of blocks 1105-1110. Between each iteration, edits defining atomical physical changes can be made to the underlying dataset by the one or more user and/or the at least one user as set forth herein. The processing described can iterate until at decision block 1118 manager system 110 determines that model M and the associated dataset for training model M are qualified. Accordingly, a feedback loop can be provided wherein manager system 110 iteratively prompts for user-defined updates input into a user interface until threshold satisfying level of data quality is achieved. In one example of the iterative feedback loop processing, variable data area 9150 of the user interface as shown in FIG. 9, at each iteration, can present text base data specifying a quantitative result of the most recent described dataset data quality evaluation and indictors of the semantic operation group data changes that were approved (e.g., the prompting data for approved groups can be presented with highlight) for implementation and registration in the updated dataset subject to the most recent data quality evaluation. Accordingly, for guiding subsequent selections of the user, the user can be presented prompting data in the form of an indicator of the impact on data quality of the most recent change.

According, there is set forth herein discovering semantic operations within a table based dataset, wherein the discovering semantic operations within the table based dataset includes examining of logging data, wherein the logging data specifies atomical physical changes that have been applied to the table based dataset responsively to receipt of change specifying input data from one or more user, wherein the table based dataset includes at least one table having rows and columns that define cells; generating prompting data in dependence on the discovering semantic operations within the table based dataset; and interacting with at least one user in dependence on the discovering semantic operations within the table based dataset, wherein the interacting with the at least one user in dependence on the discovering semantic operations within the table based dataset includes presenting on a user interface the generated prompting data to the at least one user, wherein the prompting data prompts the at least one user to perform at least one action with respect to the table based dataset, wherein method includes receiving approval from the at least one user to implement a group of semantic operations identified responsively to the discovering the semantic operations within a table based dataset, assessing a data quality of the dataset responsively to the receiving, and repeating the discovering semantic operations within the table based dataset, the generating prompting data in dependence on the discovering semantic operations within the table based dataset, and the presenting on a user interface the generated prompting data to the at least one user responsively a determination based on the assessing that the dataset includes insufficient data quality.

Manager system 110 on determining that model M and the associated dataset for training model M are qualified, manager system 110 can proceed to predicting block 1119.

At predicting block 1119, manager system 110 can perform querying of model M defining a trained predictive model trained at training block 1116 for return of an output prediction wherein the output prediction can be used in an underlying production service provided by manager system 110 to end users. On completion of predicting at block 1119, manager system 110 can proceed to send block 1120. At send block 1120, manager system 110 can send service defining data to an enterprise system of enterprise systems 150A-150Z in dependence on an output prediction, and at block 1501 the enterprise system 110 can perform an action responsively to the service defining data. In one example the output prediction of block 1119 can be a prediction specifying predicted loading of a virtual machine defined server, the service defining data sent at block 1120 can include command data to launch a virtual machine satisfying the predicted loading, and the action at block 1501 can include launching the virtual machine to satisfy the predicted loading. In one example the output prediction of block 1119 can be a prediction specifying predicted loading of a virtual machine defined server, the service defining data sent at block 1120 can include command data to migrate a virtual machine to a new computer environment for satisfying the predicted loading, and the action at block 1501 can include migrating the virtual machine to the new computer environment for satisfying the predicted loading.

In one example, the output prediction of block 1119 can be a prediction specifying a predicted optimized parameter of an industrial machine process involving operation of a mechanical machine (e.g., drilling rate, weight loading capacity, and the like), the service defining data sent at block 1120 can include data specifying the output prediction, and the action at block 1501 can include performing a industrial machine mechanical process in accordance with the prediction specifying the predicted optimized parameter of an industrial machine mechanical process, e.g., drilling rate, weight loading capacity.

On completion of send block 1120 manager system 110 can proceed to return block 1121. At return block 1121, manager system 110 can return to block 1101 to send a next iteration of query data to data sources 130A-130Z for obtaining next iteration of data for populating a dataset of dataset area 2121. Manager system 110 can iteratively perform the loop of blocks 1101-1121 during a deployment period of manager system 110. It will be understood that manager system 110 can be iteratively performing multiple instances of the loop of blocks 1101-1121 for multiple different datasets and for multiple different sets of one or more user and at least one user as set forth herein. Data sources 130A-130Z on completion of block 1301 can proceed to return block 1302. At return block 1302 data sources 130A-130Z can return to a stage preceding block 1301. Data sources 130A-130Z can be iteratively performing the loop of blocks 1302 for the deployment period of data sources 130A-130Z. UE devices 140A-140Z on completion of block 1403 can proceed to return block 1402. At return block 1404 enterprise systems 150A-150Z can return to a stage preceding block 1501. UE devices 140A-140Z can be iteratively performing the loop of blocks 1401-1404 for the deployment period of UE devices 140A-140Z. Enterprise systems 150A-150Z on completion of block 1501 can proceed to return block 1502. At return block 1502 enterprise systems 150A-150Z can return to a stage preceding block 1501. Enterprise systems 150A-150Z can be iteratively performing the loop of blocks 1501-1502 during a deployment period of enterprise systems 150A-150Z.

Figure 10:
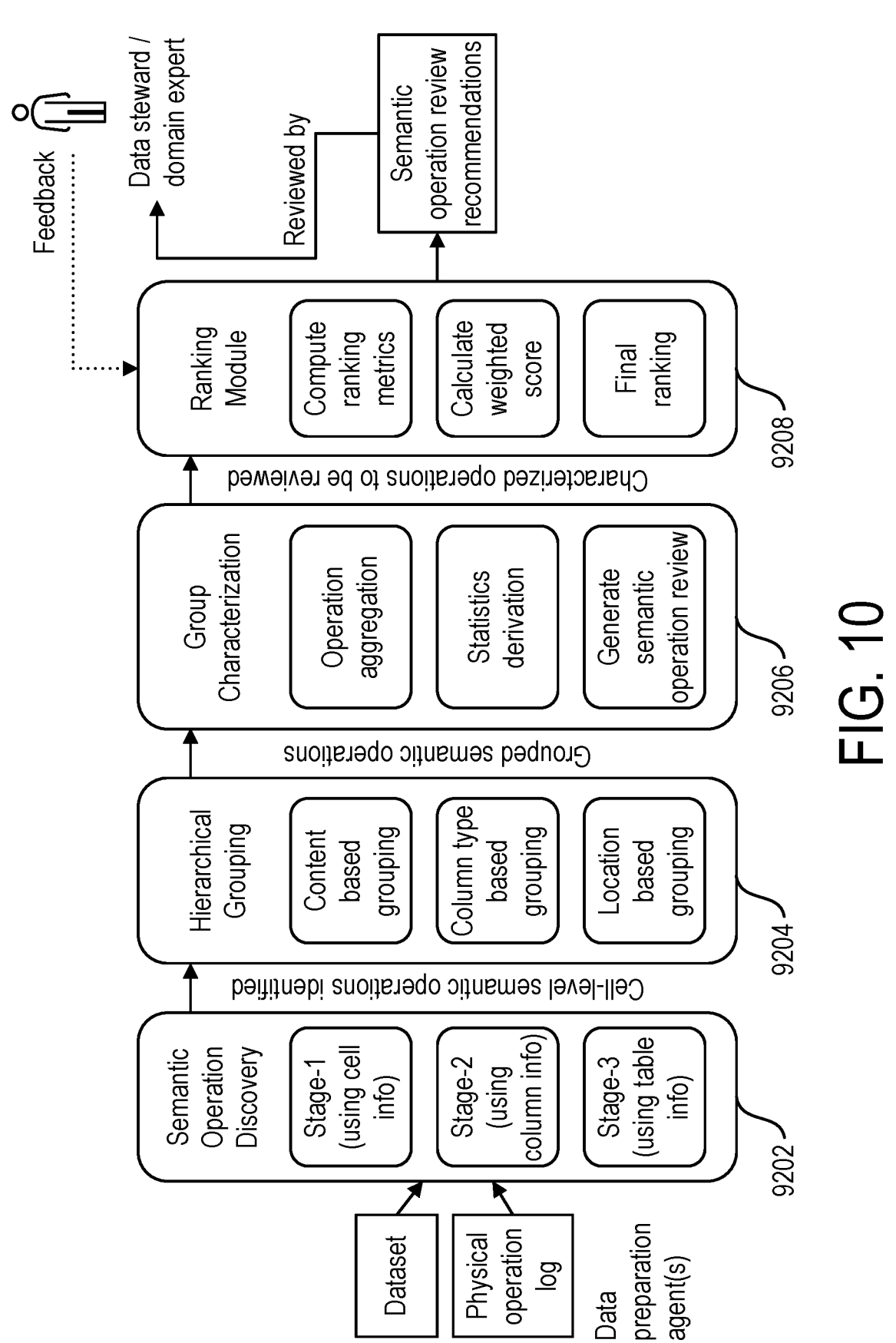
FIG. 10 depicts data logging, semantic discovery processing, group identification processing, and group evaluating processing according to one embodiment.

Referring to FIG. 10, processing herein can include semantic operation discovery at block 9202 as further described in reference to block 1106 of the flowchart of FIG. 2, identification of semantic operation groups at block 9204 as further described in reference to block 1107 of the flowchart of FIG. 2, characterization of identified semantic operation groups at block 9206 as further described in reference to block 1108 of the flowchart of FIG. 2, and evaluating (including ranking) of identified semantic operation groups at block 9208 as further described in reference to block 1109 of flowchart of FIG. 2.

Embodiments herein recognize that data preparation can benefit from features for ensuring data quality. Embodiments herein recognize that quality of data can directly impact downstream analytic and modeling tasks. Embodiments herein recognize that in some use cases many changes can be made to data during data preparation. These data changes can be due to various reasons like misspelling, wrong format, inconsistency etc. Embodiments herein recognize that changes made to the data can benefit from being reviewed before accepting and approving them in a collaborative work environment. Embodiments herein recognize that reviewing these data changes can be subject to error task due to many reasons, including, e.g., sheer scale of the dataset. Embodiments herein recognize that due to aspects of changes to review in various use cases, changes are beyond a human user's ability to understand and validate why certain updates are done. Embodiments herein can include a semantic reasoning feature for facilitating human user comprehension of changes.

Embodiments herein recognize that often the reviewer is different from the person who makes the data changes. For example, data governance officer/project manager can provide access to datasets in a data catalog, while a data engineer/data scientist makes changes to data. Embodiments herein recognize that these changes can benefit from review, approving, or disapproving before adding the data back to the data catalog or using it for a downstream task such as a downs stream enterprise process, e.g., IT process or mechanical machine process.

Embodiments herein can include features so that respective physical data update operations have associated thereto an underlying semantic reasoning. This semantic reasoning will make it easier for a human user to understand the "why" along with "what" of the operation. Embodiments herein recognize that is neither explicit nor easy to understand semantic meaning of each data updates while reviewing changes to a dataset. Also, embodiments herein recognize that it is very difficult to review these changes without a collective view of such changes over the whole dataset.

Embodiments herein can include a system and related methods for semantically understanding updates made to a dataset and group them intelligently for collective semantic reviewing of such changes. The described approach for reviewing (and approving or disapproving) changes made to a dataset is both efficient and less error-prone.

Various available tools, libraries, and/or services can be utilized for implementation of predictive models herein. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g., retrieval of metadata for a given predictive model, deployment of models and management of deployed models, online deployment, scoring, batch deployment, stream deployment, monitoring and retraining deployed models. According to one possible implementation, a machine learning service can provide access set of REST APIs that can be called from any programming language and that permit the integration of predictive analytics into any application. Enabled REST APIs can provide e.g., retrieval of metadata for a given predictive model, deployment of models and management of deployed models, online deployment, scoring, batch deployment, stream deployment, monitoring and retraining deployed models. Predictive models herein can employ a variety of machine learning technologies, e.g., neural networks, support vector machines (SVM), Bayesian networks, and/or other machine learning technologies.

There is set forth herein a system and method for automatically generating collective review summary of updates made in a dataset during data preparation with a method to analyse cell level data changes and discover the intended semantic operation by collective reasoning, a method to group the semantic operations discovered by data content, data type or location of change, and a method to build aggregate views on grouped semantic operations and thus summarize the review recommendations and a method to rank them by priority, and a method to consider user feedback for incremental improvement of the ranking of semantic review.

Certain embodiments herein may offer various technical computing advantages involving computing advantages to address problems arising in the realm of computer systems and computer networks. Embodiments herein can include an interactive user interface that presents prompting data to a user and performs actions with respect to a dataset responsively to selection data of user defined with use of the user interface. In one example, prompting data can be iteratively presented to user, and dataset quality can be assessed until selection data is defined that results in threshold satisfying dataset quality. Embodiments herein can include an inter-active user interface that guides a user in the preparation of a dataset for use in performance of downstream processing, which can include, e.g., training a predictive model, and performing processing, such as IT services processing, mechanical processing in accordance with predictions output by the predictive model. Embodiments herein can include interactively responding to activation of a user by performing processing of a table based dataset to reveal hidden properties of the dataset beyond a human user's capacity to observe. In response to activation by a user, embodiments herein can include activating a logging process to generate logging data that specifies atomical physical changes made to a table based dataset and performing a variety of additional processes, including semantic operation discovery grouping, characterizing, and evaluating. In dependence on outputs by the semantic operation discovery, grouping, characterizing, and evaluating, prompting data can be generated and presented to a user that prompts a user to approve or disapprove changes to a dataset. In response to presented prompting data, a user can approve or disapprove prompted for changes to a dataset. Embodiments herein can feature an interactive user interface so that a user is restricted from approving a dataset for use in a downstream task, e.g., predictive model training, analytics, without presentment of prompting data prompting for changes to a dataset. Various decision data structures can be used to drive artificial intelligence (AI) decision making, such as decision data structures employed for evaluation of identified semantic operation groups. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can examine data from diverse data sources. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 11:
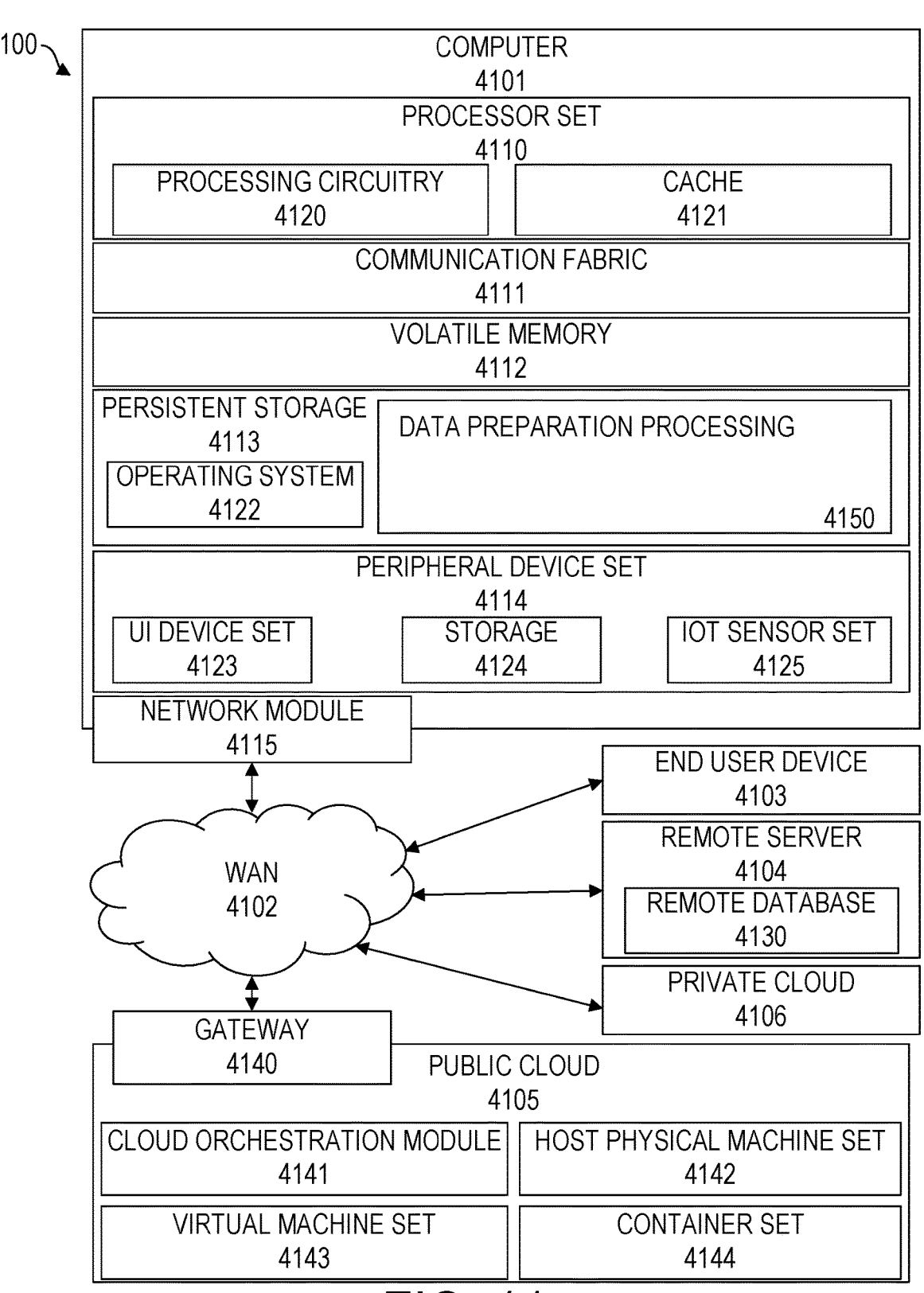
FIG. 11 depicts a computing environment according to one embodiment.

In reference to FIG. 11 there is set forth a description of a computing environment 4100 that can include one or more computer 4101. In one example, computing node 10 as set forth herein can be provided in accordance with computer 4101 as set forth in FIG. 11.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Hash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 11. In one aspect, a computing environment 4100 contains an example of an environment for the execution of at least some of the computer code involved in performing the inventive methods, such as code 4150 for performing dataset preparation processing as described in reference to FIGS. 1-10. In addition to block 4150, computing environment 4100 includes, for example, computer 4101, wide area network (WAN) 4102, end user device (EUD) 4103, remote server 4104, public cloud 4105, and private cloud 4106. In this embodiment, computer 4101 includes processor set 4110 (including processing circuitry 4120 and cache 4121), communication fabric 4111, volatile memory 4112, persistent storage 4113 (including operating system 4122 and block 4150, as identified above), peripheral device set 4114 (including user interface (UI) device set 4123, storage 4124, and Internet of Things (IoT) sensor set 4125), and network module 4115. Remote server 4104 includes remote database 4130. Public cloud 4105 includes gateway 4140, cloud orchestration module 4141, host physical machine set 4142, virtual machine set 4143, and container set 4144. IoT sensor set 4125, in one example, can include a Global Positioning Sensor (GPS) device, one or more of a camera, a gyroscope, a temperature sensor, a motion sensor, a humidity sensor, a pulse sensor, a blood pressure (bp) sensor or an audio input device.

Computer 4101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 4130. As is well understood in the art of computer technology, and depending upon the technology, performance of a computer-implemented method may be distributed among multiple computers and/or between multiple locations. On the other hand, in this presentation of computing environment 4100, detailed discussion is focused on a single computer, specifically computer 4101, to keep the presentation as simple as possible. Computer 4101 may be located in a cloud, even though it is not shown in a cloud in FIG. 1. On the other hand, computer 4101 is not required to be in a cloud except to any extent as may be affirmatively indicated.

Processor set 4110 includes one, or more, computer processors of any type now known or to be developed in the future. Processing circuitry 4120 may be distributed over multiple packages, for example, multiple, coordinated integrated circuit chips. Processing circuitry 4120 may implement multiple processor threads and/or multiple processor cores. Cache 4121 is memory that is located in the processor chip package(s) and is typically used for data or code that should be available for rapid access by the threads or cores running on processor set 4110. Cache memories are typically organized into multiple levels depending upon relative proximity to the processing circuitry. Alternatively, some, or all, of the cache for the processor set may be located "off chip." In some computing environments, processor set 4110 may be designed for working with qubits and performing quantum computing.

Computer readable program instructions are typically loaded onto computer 4101 to cause a series of operational steps to be performed by processor set 4110 of computer 4101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 4121 and the other storage media discussed below. The program instructions, and associated data, are accessed by processor set 4110 to control and direct performance of the inventive methods. In computing environment 4100, at least some of the instructions for performing the inventive methods may be stored in block 4150 in persistent storage 4113.

Communication fabric 4111 is the signal conduction paths that allow the various components of computer 4101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 4112 is any type of volatile memory now known or to be developed in the future. Examples include dynamic type random access memory (RAM) or static type RAM. Typically, the volatile memory is characterized by random access, but this is not required unless affirmatively indicated. In computer 4101, the volatile memory 4112 is located in a single package and is internal to computer 4101, but, alternatively or additionally, the volatile memory may be distributed over multiple packages and/or located externally with respect to computer 4101.

Persistent storage 4113 is any form of non-volatile storage for computers that is now known or to be developed in the future. The non-volatility of this storage means that the stored data is maintained regardless of whether power is being supplied to computer 4101 and/or directly to persistent storage 4113. Persistent storage 4113 may be a read only memory (ROM), but typically at least a portion of the persistent storage allows writing of data, deletion of data and re-writing of data. Some familiar forms of persistent storage include magnetic disks and solid state storage devices. Operating system 4122 may take several forms, such as various known proprietary operating systems or open source. Portable Operating System Interface-type operating systems that employ a kernel. The code included in block 4150 typically includes at least some of the computer code involved in performing the inventive methods.

Peripheral device set 4114 includes the set of peripheral devices of computer 4101. Data communication connections between the peripheral devices and the other components of computer 4101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 4123 may include components such as a display screen, speaker, microphone, wearable devices (such as goggles and smart watches), keyboard, mouse, printer, touchpad, game controllers, and haptic devices. Storage 4124 is external storage, such as an external hard drive, or insertable storage, such as an SD card. Storage 4124 may be persistent and/or volatile. In some embodiments, storage 4124 may take the form of a quantum computing storage device for storing data in the form of qubits. In embodiments where computer 4101 is required to have a large amount of storage (for example, where computer 4101 locally stores and manages a large database) then this storage may be provided by peripheral storage devices designed for storing very large amounts of data, such as a storage area network (SAN) that is shared by multiple, geographically distributed computers. IoT sensor set 4125 is made up of sensors that can be used in Internet of Things applications. For example, one sensor may be a thermometer and another sensor may be a motion detector. A sensor of IoT sensor set 4125 can alternatively or in addition include, e.g., one or more of a camera, a gyroscope, a humidity sensor, a pulse sensor, a blood pressure (bp) sensor or an audio input device.

Network module 4115 is the collection of computer software, hardware, and firmware that allows computer 4101 to communicate with other computers through WAN 4102. Network module 4115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 4115 are performed on the same physical hardware device. In other embodiments (for example, embodiments that utilize software-defined networking (SDN)), the control functions and the forwarding functions of network module 4115 are performed on physically separate devices, such that the control functions manage several different network hardware devices. Computer readable program instructions for performing the inventive methods can typically be downloaded to computer 4101 from an external computer or external storage device through a network adapter card or network interface included in network module 4115.

WAN 4102 is any wide area network (for example, the internet) capable of communicating computer data over non-local distances by any technology for communicating computer data, now known or to be developed in the future. In some embodiments, the WAN 4102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 4103 is any computer system that is used and controlled by an end user (for example, a customer of an enterprise that operates computer 4101), and may take any of the forms discussed above in connection with computer 4101. EUD 4103 typically receives helpful and useful data from the operations of computer 4101. For example, in a hypothetical case where computer 4101 is designed to provide a recommendation to an end user, this recommendation would typically be communicated from network module 4115 of computer 4101 through WAN 4102 to EUD 4103. In this way, EUD 4103 can display, or otherwise present, the recommendation to an end user. In some embodiments, EUD 4103 may be a client device, such as thin client, heavy client, mainframe computer, desktop computer and so on.

Remote server 4104 is any computer system that serves at least some data and/or functionality to computer 4101. Remote server 4104 may be controlled and used by the same entity that operates computer 4101. Remote server 4104 represents the machine(s) that collect and store helpful and useful data for use by other computers, such as computer 4101. For example, in a hypothetical case where computer 4101 is designed and programmed to provide a recommendation based on historical data, then this historical data may be provided to computer 4101 from remote database 4130 of remote server 4104.

Public cloud 4105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 4105 is performed by the computer hardware and/or software of cloud orchestration module 4141. The computing resources provided by public cloud 4105 are typically implemented by virtual computing environments that run on various computers making up the computers of host physical machine set 4142, which is the universe of physical computers in and/or available to public cloud 4105. The virtual computing environments (VCEs) typically take the form of virtual machines from virtual machine set 4143 and/or containers from container set 4144. It is understood that these VCEs may be stored as images and may be transferred among and between the various physical machine hosts, either as images or after instantiation of the VCE. Cloud orchestration module 4141 manages the transfer and storage of images, deploys new instantiations of VCEs and manages active instantiations of VCE deployments. Gateway 4140 is the collection of computer software, hardware, and firmware that allows public cloud 4105 to communicate through WAN 4102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 4106 is similar to public cloud 4105, except that the computing resources are only available for use by a single enterprise. While private cloud 4106 is depicted as being in communication with WAN 4102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 4105 and private cloud 4106 are both part of a larger hybrid cloud.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:

in response to receiving query data from a data source, discovering, by activating a data process executed on a computing node based system, semantic operations within a table based dataset, wherein the discovering semantic operations within the table based dataset includes examining logging data, wherein the logging data specifies atomical physical changes that have been applied to the table based dataset responsively to receipt of change specifying input data from one or more user, wherein the table based dataset includes at least one table having rows and columns that define cells;

generating, by the computing node based system, prompting data in dependence on the discovering semantic operations within the table based dataset;

sending, by the computing node based system, the prompting data to at least one user device; and interacting, via a user interface, with at least one user in dependence on the discovering semantic operations within the table based dataset, wherein the interacting with the at least one user in dependence on the discovering semantic operations within the table based dataset includes presenting on the user interface the generated prompting data to the at least one user, wherein the prompting data prompts the at least one user to perform at least one action with respect to the table based dataset, wherein the method includes identifying a semantic operation group based on first and second cells of the table based dataset having common semantic operation tags resulting from the discovering, and wherein the prompting data presented on the user interface includes an action specifying text string mapping to the semantic operation group, and wherein generation of the action specifying text string mapping to the semantic operation group has included querying a trained predictive model that has been trained to return strings of dataset action specifying text in response to being queried with query data specifying characteristics of the semantic operation group.

2. The computer implemented method of claim 1, wherein the discovering semantic operations within the table based dataset includes determining a semantic operation defined by an atomical physical change of the atomical physical changes.

3. The computer implemented method of claim 1, wherein the discovering semantic operations within the table based dataset includes determining a semantic operation defined by an atomical physical change of the atomical physical changes, wherein the semantic operation specifies a reason for performance of the atomical physical change.

4. The computer implemented method of claim 1, wherein the method includes iteratively performing the discovering semantic operations within the table based dataset, the generating prompting data in dependence on the discovering semantic operations within the table based dataset, and the presenting on the user interface the generated prompting data to the at least one user.

5. The computer implemented method of claim 1, wherein the method includes identifying a second semantic operation group based on third and fourth cells of the table based dataset having matching semantic operation tags resulting from the discovering, and wherein the prompting data presented on the user interface includes a second action specifying text string mapping to the second semantic operation group.

6. The computer implemented method of claim 1, wherein the method includes iteratively performing the discovering semantic operations within the table based dataset, the generating prompting data in dependence on the discovering semantic operations within the table based dataset, and the presenting on the user interface the generated prompting data to the at least one user, wherein the prompting data presented on the user interface includes text based data specifying a predicted impact on data quality of the table based dataset associated to a group of semantic operations identified responsively to the discovering.

7. The computer implemented method of claim 1, wherein the method includes receiving approval from the at least one user to implement a group of semantic operations identified responsively to the discovering the semantic operations within a table based dataset, assessing a data quality of the table based dataset responsively to the receiving, and repeating the discovering semantic operations within the table based dataset.

8. The computer implemented method of claim 1, wherein the discovering semantic operations within the table based dataset includes determining a semantic operation defined by an atomical physical change of the atomical physical changes, wherein the semantic operation is selected from the group consisting of a representation change, a value change, a format change, a unit change, a value correction, a synonym substitution, a misspelling reason for change, a representation correction reason for change, a domain correction reason for change, a value correction reason for change, a consistency in representation reason for change, and consistency in domain reason for change.

9. The computer implemented method of claim 1, wherein the discovering semantic operations within the table based dataset includes determining a semantic operation defined by an atomical physical change of the atomical physical changes, wherein the semantic operation is selected from the group consisting of a representation correction reason for change, a domain correction reason for change, a domain correction reason for change, a value correction reason for change, a consistency in representation reason for change, and a consistency in domain reason for change.

10. The computer implemented method of claim 1, wherein the method includes receiving approval from the at least one user to implement a group of semantic operations identified responsively to the discovering the semantic operations within a table based dataset, assessing a data quality of the table based dataset responsively to the receiving, and repeating the discovering semantic operations within the table based dataset, the generating prompting data in dependence on the discovering semantic operations within the table based dataset, and the presenting on the user interface the generated prompting data to the at least one user responsively to a determination based on the assessing that the table based dataset includes insufficient data quality.

11. A system comprising:
  a memory;
  at least one processor in communication with the memory; and
  program instructions executable by one or more processor via the memory to perform a method comprising:
    in response to receiving query data from a data source, discovering, by activating a data process executed on a computing node based system, semantic operations within a table based dataset, wherein the discovering semantic operations within the table based dataset includes examining logging data, wherein the logging data specifies atomical physical changes that have been applied to the table based dataset responsively to receipt of change specifying input data from one or more user, wherein the table based dataset includes at least one table having rows and columns that define cells;
    generating prompting data in dependence on the discovering semantic operations within the table based dataset;
    sending the prompting data to at least one user device; and
    interacting, via a user interface, with at least one user in dependence on the discovering semantic operations within the table based dataset, wherein the interacting with the at least one user in dependence on the discovering semantic operations within the table based dataset includes presenting on the user interface the generated prompting data to the at least one user, wherein the prompting data prompts the at least one user to perform at least one action with respect to the table based dataset, wherein the method includes identifying a semantic operation group based on first and second cells of the table based dataset having common semantic operation tags resulting from the discovering, and wherein the prompting data presented on the user interface includes an action specifying text string mapping to the semantic operation group, and wherein generation of the action specifying text string mapping to the semantic operation group has included querying a trained predictive model that has been trained to return strings of dataset action specifying text in response to being queried with query data specifying characteristics of the semantic operation group.

12. The system of claim 11, wherein the method includes iteratively performing the discovering semantic operations within the table based dataset, the generating prompting data in dependence on the discovering semantic operations within the table based dataset, and the presenting on the user interface the generated prompting data to the at least one user.

13. The system of claim 11, wherein the discovering semantic operations within the table based dataset includes determining, for a first atomical physical change to a first cell of the table based dataset, first semantic operation tags, determining, for a second atomical physical change to a second cell of the table based dataset, second semantic operation tags, determining, for a third atomical physical change to a third cell of the table based dataset, third semantic operation tags, determining, for a fourth atomical physical change to a fourth cell of the table based dataset, fourth semantic operation tags, matching the first semantic operation tags to the second semantic operation tags, performing matching of the third semantic operation tags to the fourth semantic operation tags, identifying a first group of semantic operations based on the matching, identifying a second group of semantic operations based on the performing matching, wherein the generating the prompting data in dependence on the performing of the semantic operation discovery of the table based dataset includes performing the generating in dependence on an evaluating of the first group and the second group, wherein the evaluating includes scoring the first group based on multiple factors, performing scoring of the second group based on the multiple factors, and ranking the first group and the second group in dependence on the scoring and the performing scoring, wherein the method includes iteratively performing the discovering semantic operations within the table based dataset, the generating prompting data in dependence on the discovering semantic operations within the table based dataset, and the presenting on the user interface the generated prompting data to the at least one user, wherein the prompting data presented on the user interface includes text based data specifying a predicted impact on data quality of the table based dataset associated to a group of semantic operations identified responsively to the discovering, wherein the method includes receiving approval from the at least one user to implement a group of semantic operations identified responsively to the discovering the semantic operations within a table based dataset, assessing a data quality of the dataset responsively to the receiving, and performing an iteration of the discovering semantic operations within the table based dataset, the generating prompting data in dependence on the discovering semantic operations within the table based dataset, and the presenting on the user interface the generated prompting data to the at least one user responsively to a determination based on the assessing that the dataset includes insufficient data quality.

14. A computer implemented method comprising:
in response to receiving query data from a data source;
discovering, by activating a data process executed on a computing node based system, semantic operations within a table based dataset, wherein the discovering semantic operations within the table based dataset includes examining logging data, wherein the logging data specifies atomical physical changes that have been applied to the table based dataset responsively to receipt of change specifying input data from one or more user, wherein the table based dataset includes at least one table having rows and columns that define cells;
generating, by the computing node based system, prompting data in dependence on the discovering semantic operations within the table based dataset;
sending, by the computing node based system, the prompting data to at least one user device; and
interacting, via a user interface, with at least one user in dependence on the discovering semantic operations within the table based dataset, wherein the interacting with the at least one user in dependence on the discovering semantic operations within the table based dataset includes presenting on the user interface the generated prompting data to the at least one user, wherein the prompting data prompts the at least one user to perform at least one action with respect to the table based dataset, wherein the method includes receiving approval from the at least one user to implement a group of semantic operations identified responsively to the discovering the semantic operations within a table based dataset, assessing a data quality of the table based dataset responsively to the receiving, and repeating the discovering semantic operations within the table based dataset.

15. The computer implemented method of claim 14, wherein the method includes identifying a semantic operation group based on first and second cells of the table based dataset having common semantic operation tags resulting from the discovering, and wherein the prompting data presented on the user interface includes an action specifying text string mapping to the semantic operation group.

16. The computer implemented method of claim 14, wherein the method includes identifying a semantic operation group based on first and second cells of the table based dataset having common semantic operation tags resulting from the discovering, and wherein the prompting data presented on the user interface includes an action specifying text string mapping to the semantic operation group, and wherein generation of the action specifying text string mapping to the semantic operation group has included querying a trained predictive model that has been trained to return strings of dataset action specifying text in response to being queried with query data specifying characteristics of the semantic operation group.

17. The computer implemented method of claim 14, wherein the discovering semantic operations within the table based dataset includes determining, for a first atomical physical change to a first cell of the table based dataset, a first one or more semantic operation tag, determining, for a second atomical physical change to a second cell of the table based dataset, a second one or more semantic operation tag, determining, for a third atomical physical change to a third cell of the table based dataset, a third one or more semantic operation tag, determining, for a fourth atomical physical change to a fourth cell of the table based dataset, a fourth one or more semantic operation tag, matching the first one or more semantic operation tag to the second one or more semantic operation tag, performing matching of the third one or more semantic operation tag to the fourth one or more semantic operation tag, identifying a first group of semantic operations based on the matching, identifying a second group of semantic operations based on the performing matching, wherein the generating the prompting data in dependence on the performing of the semantic operation discovery of the table based dataset includes performing the generating in dependence on an evaluating of the first group and the second group.

18. The computer implemented method of claim 14, wherein the discovering semantic operations within the table based dataset includes determining, for a first atomical physical change to a first cell of the table based dataset, first semantic operation tags, determining, for a second atomical physical change to a second cell of the table based dataset, second semantic operation tags, determining, for a third atomical physical change to a third cell of the table based dataset, third semantic operation tags, determining, for a fourth atomical physical change to a fourth cell of the table based dataset, fourth semantic operation tags, matching the first semantic operation tags to the second semantic operation tags, performing matching of the third semantic operation tags to the fourth semantic operation tags, identifying a first group of semantic operations based on the matching, identifying a second group of semantic operations based on the performing matching, wherein the generating the prompting data in dependence on the performing of the semantic operation discovery of the table based dataset includes performing the generating in dependence on an evaluating of the first group and the second group, wherein the evaluating includes scoring the first group based on multiple factors, performing scoring of the second group based on the multiple factors, and ranking the first group and the second group in dependence on the scoring and the performing scoring.

19. The computer implemented method of claim 14, wherein the discovering semantic operations within the table based dataset includes determining, for a first atomical physical change to a first cell of the table based dataset, first semantic operation tags, determining, for a second atomical physical change to a second cell of the table based dataset, second semantic operation tags, determining, for a third atomical physical change to a third cell of the table based dataset, third semantic operation tags, determining, for a fourth atomical physical change to a fourth cell of the table based dataset, fourth semantic operation tags, matching the first semantic operation tags to the second semantic operation tags, performing matching of the third semantic operation tags to the fourth semantic operation tags, identifying a first group of semantic operations based on the matching, identifying a second group of semantic operations based on the performing matching, wherein the generating the prompting data in dependence on the performing of the semantic operation discovery of the table based dataset includes performing the generating in dependence on an evaluating of the first group and the second group, wherein the evaluating includes scoring the first group based on multiple factors, performing scoring of the second group based on the multiple factors, and ranking the first group and the second group in dependence on the scoring and the performing scoring, wherein the method includes iteratively performing the discovering semantic operations within the table based dataset, the generating prompting data in dependence on the discovering semantic operations within the table based dataset, and the presenting on the user interface the generated prompting data to the at least one user, wherein the prompting data presented on the user interface includes text based data specifying a predicted impact on data quality of the table based dataset associated to a group of semantic operations identified responsively to the discovering, wherein the method includes receiving approval from the at least one user to implement the group of semantic operations identified responsively to the discovering the semantic operations within a table based dataset, assessing a data quality of the table based dataset responsively to the receiving, and performing an iteration of the discovering semantic operations within the table based dataset, the generating prompting data in dependence on the discovering semantic operations within the table based dataset, and the presenting on the user interface the generated prompting data to the at least one user responsively to a determination based on the assessing that the table based dataset includes insufficient data quality.

20. The computer implemented method of claim 14, wherein the method includes identifying a semantic operation group based on first and second cells of the table based dataset having common semantic operation tags resulting from the discovering, and wherein the prompting data presented on the user interface includes an action specifying text string that specifies action to be taken by the one or more user with respect to the semantic operation group.

* * * * *